(12) United States Patent
Huertas Fernandez et al.

(10) Patent No.: US 12,544,574 B2
(45) Date of Patent: Feb. 10, 2026

(54) AUTONOMIC NERVOUS SYSTEM NEUROMODULATION VIA SPINAL CORD STIMULATION

(71) Applicant: Boston Scientific Neuromodulation Corporation, Valencia, CA (US)

(72) Inventors: Ismael Huertas Fernandez, Seville (ES); Que T. Doan, West Hills, CA (US)

(73) Assignee: Boston Scientific Neuromodulation Corporation, Valencia, CA (US)

( * ) Notice: Subject to any disclaimer, the term of this patent is extended or adjusted under 35 U.S.C. 154(b) by 347 days.

(21) Appl. No.: 18/144,704

(22) Filed: May 8, 2023

(65) Prior Publication Data
US 2023/0355979 A1 Nov. 9, 2023

Related U.S. Application Data

(60) Provisional application No. 63/339,768, filed on May 9, 2022.

(51) Int. Cl.
*A61N 1/36* (2006.01)
*A61N 1/372* (2006.01)

(52) U.S. Cl.
CPC ..... *A61N 1/36071* (2013.01); *A61N 1/36062* (2017.08); *A61N 1/36132* (2013.01); *A61N 1/36185* (2013.01); *A61N 1/37247* (2013.01)

(58) Field of Classification Search
CPC ............ A61N 1/36071; A61N 1/36062; A61N 1/36132; A61N 1/36185; A61N 1/37247
See application file for complete search history.

(56) References Cited

U.S. PATENT DOCUMENTS

| | | |
|---|---|---|
| 2007/0027484 A1 | 2/2007 | Guzman et al. |
| 2014/0067016 A1* | 3/2014 | Kaula ................ G16H 40/63 607/59 |
| 2014/0277262 A1* | 9/2014 | Rao ................ A61N 1/36185 607/46 |

(Continued)

FOREIGN PATENT DOCUMENTS

| | | |
|---|---|---|
| CN | 119522119 A | 2/2025 |
| WO | WO-2023219955 A1 | 11/2023 |

OTHER PUBLICATIONS

"International Application Serial No. PCT/US2023/021370, International Search Report mailed Aug. 2, 2023", 3 pgs.

(Continued)

*Primary Examiner* — Paula J Stice
(74) *Attorney, Agent, or Firm* — Schwegman Lundberg & Woessner, P.A.

(57) ABSTRACT

Systems and methods for controlling autonomic symptoms or side effects via spinal cord stimulation are discussed. An exemplary neuromodulation system comprises an electrostimulator to provide spinal cord stimulation (SCS) to a neural target, a user interface device to receive a user input including an autonomic symptom and affected anatomy, and a controller circuit to determine or adjust a stimulation parameter based at least on the autonomic symptoms and the affected anatomy. Spinal cord stimulation can be delivered in accordance with the determined or adjusted stimulation parameter to alleviate the autonomic symptom, or to treat or alleviate autonomic disorders.

20 Claims, 20 Drawing Sheets

(56) References Cited

U.S. PATENT DOCUMENTS

| | | |
|---|---|---|
| 2018/0085583 A1 | 3/2018 | Zhang et al. |
| 2020/0376272 A1 | 12/2020 | Block et al. |
| 2021/0008371 A1 | 1/2021 | Annecchino |
| 2021/0065903 A1* | 3/2021 | Kelley ................. A61B 34/10 |
| 2022/0241593 A1 | 8/2022 | Block et al. |

OTHER PUBLICATIONS

"International Application Serial No. PCT/US2023/021370, Written Opinion mailed Aug. 2, 2023", 3 pgs.

Cabot, J.B., et al., "Spinal Cord Lamina V and Lamina VII Interneuronal Projections to Sympathetic Preganglionic Neurons", The Journal of Comparative Neurology 347:515-530 (1994).

Craig, A.D., "Propriospinal Input to Thoracolumbar Sympathetic Nuclei From Cervical and Lumbar Lamina I Neurons in the Cat and the Monkey", The Journal of Comparative Neurology 331:517-530 (1993).

"Australian Application Serial No. 2023268406, First Examination Report mailed Jul. 21, 2025", 3 pgs.

"Chinese Application Serial No. 2023800523656, Voluntary Amendment filed Mar. 19, 2025", W/English Claims, 13 pgs.

"European Application Serial No. 23728937.6, Response to Communication pursuant to Rules 161 and 162 EPC filed May 15, 2025", 10 pgs.

"International Application Serial No. PCT/US2023/021370, International Preliminary Report on Patentability mailed Nov. 21, 2024", 5 pgs.

* cited by examiner

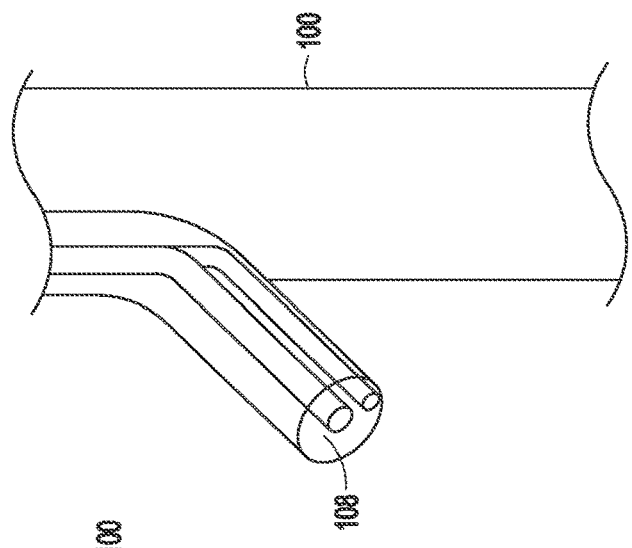
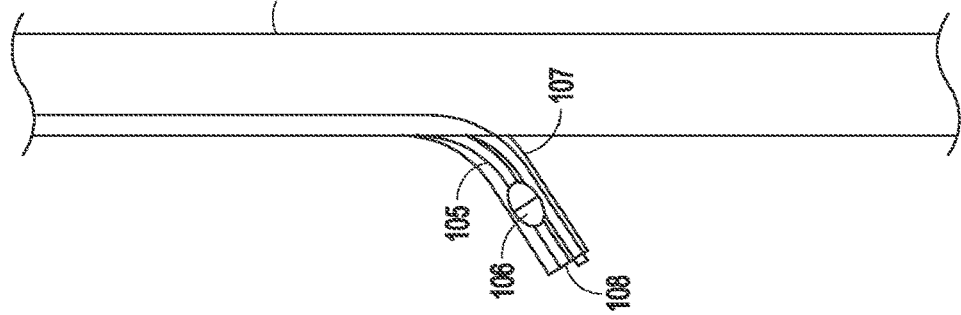
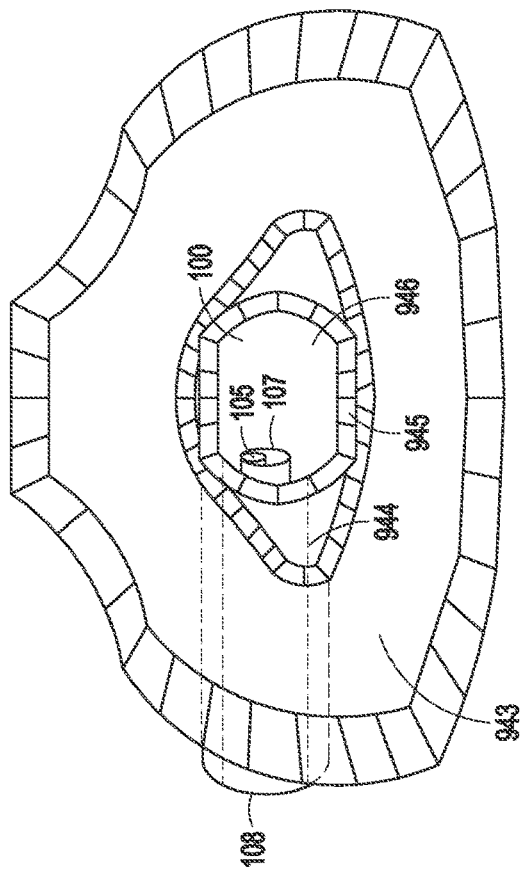
FIG. 9C
FIG. 9B
FIG. 9A

| SYSTEM ⎯1310 | ORGAN ⎯1320 | LEVEL ⎯1330 | SCS ELECTRODES ⎯1340 |
|---|---|---|---|
| CARDIOVASCULAR | HEART | C6-T5 | ... |
| GASTROINTESTINAL | STOMACH | T4-T8 | ... |
| | PANCREAS | T4-T9 | ... |
| | SMALL INTESTINE | T6-T12 | ... |
| | LARGE INTESTINE | T6-T12 | ... |
| UROGENITAL | BLADDER | T9-L2 | ... |
| | GONADS | T9-L2 | ... |

FIG. 13

|     | BAR | ON | OFF | CPH |
|-----|-----|-----|-----|-----|
| X1 X5 X10 ↓ | 0 | - | - | 403 |
| | 1 | 2 MIN | 30 SEC | 323 |
| | 2 | 2 MIN | 60 SEC | 269 |
| | ... | ... | ... | ... |
| | 40 | 90 SEC | 30 SEC | 101 |
| | ... | ... | ... | ... |
| | 99 | 30 SEC | 4 MIN 30 SEC | 40 |
| | 100 | 30 SEC | 5 MIN | 37 |

AUTONOMIC NERVOUS SYSTEM NEUROMODULATION VIA SPINAL CORD STIMULATION

CLAIM OF PRIORITY

This application claims the benefit of U.S. Provisional Application No. 63/339,768, filed on May 9, 2022, which is hereby incorporated by reference in its entirety.

TECHNICAL FIELD

This document relates generally to medical devices, and more particularly, to systems, devices and methods for modulating autonomic nervous system via spinal cord stimulation.

BACKGROUND

Chronic pain, such as pain present most of the time for a period of six months or longer during the prior year, is a highly pervasive complaint and consistently associated with psychological illness. Chronic pain may originate with a trauma, injury or infection, or there may be an ongoing cause of pain. Chronic pain may also present in the absence of any past injury or evidence of body damage. Common chronic pain can include headache, low back pain, cancer pain, arthritis pain, neurogenic pain (pain resulting from damage to the peripheral nerves or to the central nervous system), or psychogenic pain (pain not due to past disease or injury or any visible sign of damage inside or outside the nervous system).

Chronic pain may be treated or alleviated using medications, acupuncture, surgery, and neuromodulation therapy. Neuromodulation (or "neural neuromodulation", also referred to as "neurostimulation" or "neural stimulation") has been proposed as a therapy for a number of conditions. Often, neuromodulation and neural stimulation may be used interchangeably to describe excitatory stimulation that causes action potentials as well as inhibitory and other effects. Examples of neuromodulation include Spinal Cord Stimulation (SCS), Deep Brain Stimulation (DBS), Peripheral Nerve Stimulation (PNS), and Functional Electrical Stimulation (FES). SCS, by way of example and not limitation, has been used to treat chronic pain syndromes. PES has been used to treat chronic pain syndrome and incontinence, with a number of other applications under investigation. FES systems have been applied to restore some functionality to paralyzed extremities in spinal cord injury patients. DBS can be used to treat a variety of diseases or disorders.

Neuromodulation systems have been developed to provide therapy for a variety of treatments such as SCS for controlling chronic pain syndromes. An implantable neuromodulation system may include an implantable neurostimulator, also referred to as an implantable pulse generator (IPG), which can electrically stimulate tissue or nerve centers to treat nervous or muscular disorders. In an example, an IPG can deliver electrical pulses to a specific region in a patient's spinal cord, such as particular spinal nerve roots or nerve bundles, to create an analgesic effect that masks pain sensation.

SUMMARY

Autonomic symptoms (e.g., pain) may be present due to a disease or as a side effect of neuromodulation therapy such as SCS. For example, patients with diabetes may develop peripheral neuropathy, a nerve damage caused by chronically high blood sugar, which can cause numbness, loss of sensation, and sometimes pain in patient feet, legs, or hands. Depending on the affected nerves, in some patients, nerve damage can occur not only in extremities but also in other body, causing symptoms in patient digestive system, urinary tract, blood vessels and heart. On the other hand, patients receiving neuromodulation therapy (e.g., SCS) for pain control can develop side effects such as bodily fatigue, headaches, among other autonomic symptoms. For example, some patients receiving SCS for treating their lower back pain or leg pain may experience gastrointestinal side effects (e.g., constipation) or urinary side effects (e.g., incontinence). These side effects or autonomic symptoms are likely due to the direct influence of SCS on the autonomic nervous system (sympathetic pre-ganglionic neurons) through spinal segmental circuitry. The SCS-related symptoms may be attributed to overstimulation or an inappropriate stimulation setting (e.g., stimulation dose, electrode configuration, stimulation waveforms, among other stimulation parameters). Timely identification of such symptoms or side effects and proper adjustment or reconfiguration of SCS can help avoid or alleviate such symptoms and improve patient outcome.

Neuromodulation such as SCS can have therapeutic effects in treating certain conditions or diseases including, for example, cardiac neuropathy, limb ischemia, impotence, endometriosis, and various conditions, dysfunctions, or symptoms associated with the autonomic nervous system (ANS) generally known as dysautonomia. Post-ganglionic axonal processes of motor neurons in the autonomic ganglia innervate organs and tissues throughout the body (eyes, salivary glands, heart, stomach, urinary bladder, blood vessels, etc.). For example, SCS at T1-T5 levels of the spinal cord or the associated spinal nerves can be used to treat cardiac neuropathy due to its therapeutic effect of stabilizing the ANS, reducing pathologic sympathetic tone, and preventing cardiac events such as ischemia. Another condition that can be treated or alleviated with SCS is visceral pain, which refers to pain originated from or related to internal organs or blood vessels, such as bladder pain, endometriosis, irritable bowel syndrome, and prostate pain. SCS can influence visceral function by modulation of the ANS through spinal segmental circuitry (e.g., sympathetic pre-ganglionic neurons), thereby alleviating visceral pain in certain internal organs.

Various embodiments discussed in this document may provide more efficient and effective individualized management of autonomic symptoms or side effects of neuromodulation therapy in patients treated with SCS for chronic pain, and additionally or alternatively individualized SCS for treating or alleviating disorders or symptoms affecting various internal organs or tissues. A portable user interface device, such as a handheld remote control device or a smartphone executing specialized software applications as described in various examples in this disclosure, allows a user (e.g., the patient receiving SCS for pain control) to timely identify autonomic symptoms or side effects caused by or related to SCS, and adjust (automatically or manually) the SCS configuration conveniently at his or her home without clinic visits or consultation with a device expert. In accordance with one aspect of the present disclosure, a neuromodulation system comprises an electrostimulator configured to provide neurostimulation (e.g., SCS) to a neural target of the patient, a user interface device to receive a user input including autonomic symptoms and an identification of affected anatomy (e.g., anatomical systems or organs affected), and a controller circuit communicatively coupled to the user interface device. The controller circuit can determine or adjust a stimulation parameter based on the user input, and generate a control signal to the electrostimulator to deliver neurostimulation energy in accordance with the determined or adjusted stimulation parameter to alleviate the autonomic symptoms, or to treat or alleviate autonomic disorders.

The following examples illustrate various aspects of the embodiments described herein.

Example 1 is a system for providing electrostimulation to a patient, comprising: an electrostimulator configured to provide neurostimulation to a neural target of the patient via an array of electrodes; a user interface device configured to receive a user input including an autonomic symptom and an identification of affected anatomy; and a controller circuit communicatively coupled to the user interface device, the controller circuit configured to: determine or adjust a stimulation setting based on the user input of the autonomic symptom and the identification of affected anatomy; and generate a control signal to the electrostimulator to deliver neurostimulation energy in accordance with the determined or adjusted stimulation setting to alleviate the autonomic symptom or to treat autonomic disorders.

In Example 2, the subject matter of Example 1 optionally includes the neurostimulation that can include spinal cord stimulation (SCS) to a spinal neural target to control pain in the patient, and wherein the user input of the autonomic symptom and the identification of affected anatomy is in response to the SCS.

In Example 3, the subject matter of any one or more of Examples 1-2 optionally includes the stimulation setting that can include one or more stimulation parameters including: an electrode configuration; one or more stimulation pulse parameters including a pulse amplitude, a pulse width, or a stimulation frequency; a stimulation pulse waveform; an ON-OFF cycling scheme comprising an ON period for delivering stimulation pulses and a subsequent stimulation-free OFF period; or a charge per second (CPS) or a charge per hour (CPH) delivered to the neural target.

In Example 4, the subject matter of Example 3 optionally includes the stimulation setting that can include an ON-OFF cycling scheme represented by a ratio of the ON period to the subsequent OFF period in a range from 1:1 to 1:8, the stimulation pulses during the ON period each having a waveform comprising an active recharge phase.

In Example 5, the subject matter of any one or more of Examples 1-4 optionally includes the stimulation setting represented by a single composite neurostimulation dose taking a value within a specific value range, the composite neurostimulation dose corresponding to a plurality of stimulation parameters each taking respective values.

In Example 6, the subject matter of any one or more of Examples 1-5 optionally includes the user interface device that can be configured to display the user input of the autonomic symptoms and the identification of affected anatomy.

In Example 7, the subject matter of any one or more of Examples 1-6 optionally includes the user input that can further include a user indication of a severity of the autonomic symptom.

In Example 8, the subject matter of any one or more of Examples 1-7 optionally includes the neurostimulation that can include spinal cord stimulation (SCS) via an array of electrodes placed on a spinal neural target, wherein, to determine or adjust the stimulation setting, the controller circuit is configured to select one or more active electrodes from the array of electrodes for delivering the SCS based at least on (i) locations of the array of electrodes with respect to the spinal neural target, and (ii) anatomical systems or organs innervated by spinal nerves and their spinal column origins.

In Example 9, the subject matter of Example 8 optionally includes a memory circuit configured to store a lookup table representing a correspondence between the anatomical systems or organs and the spinal column origins within a stimulation field created by the array of electrodes.

In Example 10, the subject matter of any one or more of Examples 8-9 optionally includes the controller circuit that, to determine or adjust a stimulation setting, can be further configured to determine a current or energy fractionalization across the selected one or more active electrodes.

In Example 11, the subject matter of any one or more of Examples 1-10 optionally includes the user interface device that can be further configured to: display a therapy recommendation including the determined or adjusted stimulation setting; and receive a user acceptance, rejection, or modification of the stimulation setting determined or adjusted by the controller circuit.

In Example 12, the subject matter of any one or more of Examples 1-11 optionally includes the user interface device that can be further configured to: prompt a user to provide a feedback on an alleviation of the autonomic symptom or a treatment of the autonomic disorders by the neurostimulation in accordance with the determined or adjusted stimulation setting; and display a therapy recommendation including further adjustment of one or more stimulation parameters.

In Example 13, the subject matter of any one or more of Examples 1-12 optionally includes the user interface device that can be further configured to receive a user selection or adjustment of a single composite neurostimulation dose within a specific value range, the composite neurostimulation dose corresponding to a plurality of stimulation parameters each taking values within their respective value ranges.

In Example 14, the subject matter of Example 13 optionally includes the user selection or adjustment of the single composite neurostimulation dose that can be provided via a user interface control element including a slider along a one-dimensional dose bar.

In Example 15, the subject matter of any one or more of Examples 1-14 optionally includes the user interface device that can be further configured to receive a user selection from one or more stimulation modes each defined by a plurality of stimulation parameters with their respective values or value ranges.

Example 16 is a method for providing electrostimulation to a patient, the method comprising: receiving, via a user interface device, a user input including an autonomic symptom and an identification of affected anatomy; determining or adjusting a stimulation setting for an electrostimulator based on the received autonomic symptom and the identification of affected anatomy; and delivering neurostimulation energy to the patient using the electrostimulator and an array of electrodes in accordance with the determined or adjusted stimulation setting to alleviate the autonomic symptom or to treat autonomic disorders.

In Example 17, the subject matter of Example 16 optionally includes the neurostimulation that can include spinal cord stimulation (SCS) of a spinal neural target to control pain in the patient, and the user input of the autonomic symptom and the identification of affected anatomy is received in response to the SCS.

In Example 18, the subject matter of any one or more of Examples 16-17 optionally includes the stimulation setting represented by a single composite neurostimulation dose taking a value within a specific value range, the composite neurostimulation dose corresponding to a plurality of stimulation parameters each taking respective values.

In Example 19, the subject matter of any one or more of Examples 16-18 optionally include: displaying on a display of the user interface device the user input of the autonomic symptoms and the identification of affected anatomy, a severity of the autonomic symptom, and the determined or adjusted stimulation setting; and receiving via the user interface device a user acceptance, rejection, or modification of the determine stimulation setting.

In Example 20, the subject matter of any one or more of Examples 16-19 optionally include the neurostimulation that can include spinal cord stimulation (SCS) of a spinal neural target via the array of electrodes, wherein determining or adjusting the stimulation setting includes selecting one or more active electrodes from the array of electrodes for delivering the SCS based at least on (i) locations of the array of electrodes with respect to the spinal neural target, and (ii) anatomical systems or organs innervated by spinal nerves and their spinal column origins.

In Example 21, the subject matter of any one or more of Examples 16-20 optionally includes receiving, via the user interface device, a user selection or adjustment of a single composite neurostimulation dose within a specific value range, the composite neurostimulation dose corresponding to a plurality of stimulation parameters each taking values within their respective value ranges.

This Summary is an overview of some of the teachings of the present application and not intended to be an exclusive or exhaustive treatment of the present subject matter. Further details about the present subject matter are found in the detailed description and appended claims. Other aspects of the disclosure will be apparent to persons skilled in the art upon reading and understanding the following detailed description and viewing the drawings that form a part thereof, each of which are not to be taken in a limiting sense. The scope of the present disclosure is defined by the appended claims and their legal equivalents.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

FIGS. 9A-9C illustrate a transverse top view, a coronal side view and an angled view, respectively, of a nerve root.

FIG. 13 illustrate a lookup table representing a correspondence between (i) the anatomical systems and organs and (ii) spinal levels (i.e., spinal column origins of the nerves innervating the respective organs) within a stimulation field created by electrodes of the existing implanted lead system.

FIGS. 15A-15B illustrate examples of a single neurostimulation dose parameter obtained by projecting a multi-dimensional stimulation parameter space onto a one-dimensional dose domain, and its correspondence with multiple stimulation parameters with respective values in a tabular presentation.

DETAILED DESCRIPTION

The following detailed description of the present subject matter refers to the accompanying drawings which show, by way of illustration, specific aspects and embodiments in which the present subject matter may be practiced. These embodiments are described in sufficient detail to enable those skilled in the art to practice the present subject matter. Other embodiments may be utilized and structural, logical, and electrical changes may be made without departing from the scope of the present subject matter. References to "an", "one", or "various" embodiments in this disclosure are not necessarily to the same embodiment, and such references contemplate more than one embodiment. The following detailed description is, therefore, not to be taken in a limiting sense, and the scope is defined only by the appended claims, along with the full scope of legal equivalents to which such claims are entitled.

Figure 1A:
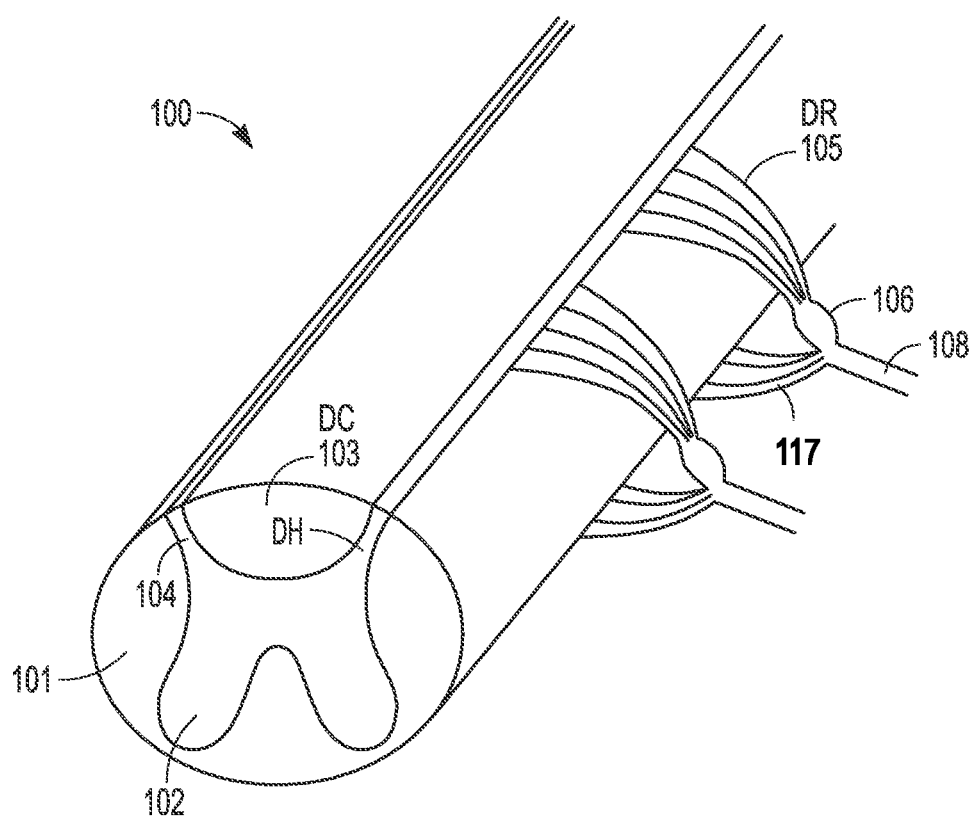
FIGS. 1A-1B illustrate a portion of a spinal cord.
Figure 1B:
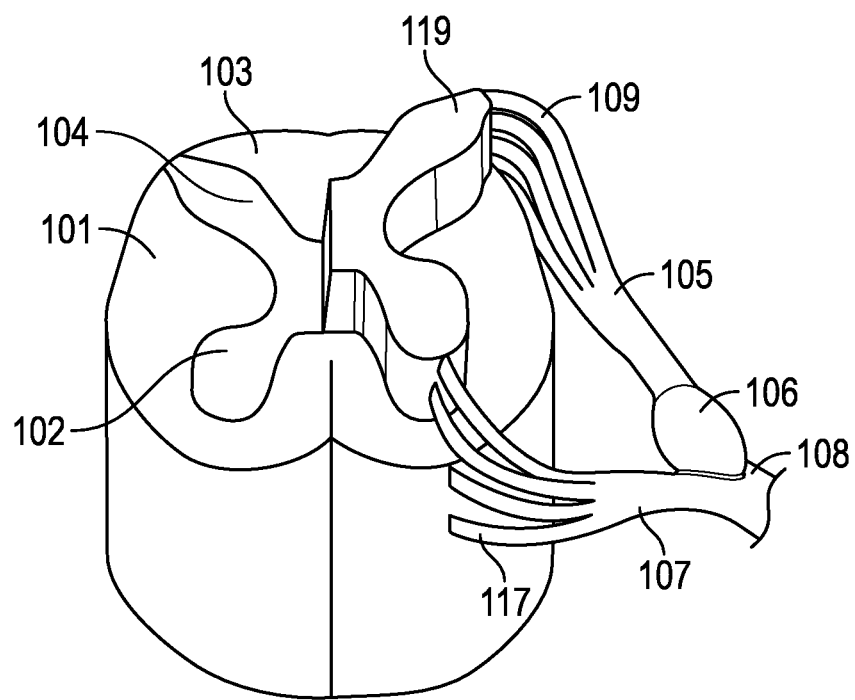

Various embodiments described herein involve spinal cord stimulation. A brief description of the physiology of the spinal cord is provided herein to assist the reader. FIGS. 1A-1B illustrate, by way of example, a portion of a spinal cord 100 including white matter 101 and gray matter 102 of the spinal cord. The gray matter 102 includes cell bodies, synapse, dendrites, and axon terminals. Thus, synapses are located in the gray matter. White matter 101 includes myelinated axons that connect gray matter areas. A typical transverse section of the spinal cord includes a central "butterfly" shaped central area of gray matter 102 substantially surrounded by an ellipse-shaped outer area of white matter 101. The white matter of the dorsal column (DC) 103 includes mostly large myelinated axons that form afferent fibers that run in an axial direction. The dorsal portions of the "butterfly" shaped central area of gray matter are referred to as dorsal horns (DH) 104. In contrast to the DC fibers that run in an axial direction, DH fibers can be oriented in many directions, including perpendicular to the longitudinal axis of the spinal cord. FIGS. 1A-1B also illustrate spinal nerves, including a dorsal root (DR) 105, dorsal rootlets 109, dorsal root ganglion (DRG) 106, ventral root 107, and ventral rootlets 117. The dorsal root 105 mostly carries sensory signals into the spinal cord via a Dorsal Root Entry Zone (DREZ) 119 of the DH 104, and the ventral root 107 functions as an efferent motor root mostly carrying motor signals out of the spinal cord. The dorsal and ventral roots join to form mixed spinal nerve root 108.

SCS has been used to alleviate pain. A therapeutic goal for conventional SCS programming has been to maximize stimulation (i.e., recruitment) of the DC fibers that run in the white matter along the longitudinal axis of the spinal cord and minimal stimulation of other fibers that run perpendicular to the longitudinal axis of the spinal cord (dorsal root fibers, predominantly), as illustrated in FIGS. 1A-1B. The white matter of the DC includes mostly large myelinated axons that form afferent fibers. While the full mechanisms of pain relief are not well understood, it is believed that the perception of pain signals is inhibited via the gate control theory of pain, which suggests that enhanced activity of innocuous touch or pressure afferents via electrical stimulation creates interneuronal activity within the DH of the spinal cord that releases inhibitory neurotransmitters (Gamma-Aminobutyric Acid (GABA), glycine), which in turn, reduces the hypersensitivity of wide dynamic range (WDR) sensory neurons to noxious afferent input of pain signals traveling from the dorsal root (DR) neural fibers that innervate the pain region of the patient, as well as treating general WDR ectopy. Consequently, the large sensory afferents of the DC nerve fibers have been targeted for stimulation at an amplitude that provides pain relief.

An implantable neuromodulation system can include electrodes implanted adjacent, i.e., resting near, or upon the dura, to the dorsal column of the spinal cord of the patient and along a longitudinal axis of the spinal cord of the patient. In some examples, electrodes can be such placed to selectively or preferentially stimulate DR tissue over other neural tissue, such as but not limited to dorsal roots, dorsal rootlets, DRG, DREZ, or Lissauer's track. A lead or leads, including a plurality of electrodes, may be positioned to place the plurality of electrodes in proximity to a targeted nerve root. For example, the electrodes may be placed adjacent to the targeted nerve root, dorsal rootlets, or DREZ. The lead(s) may be placed using surgical approaches such as a lateral anterograde approach, a lateral retrograde approach, a sacral hiatus approach, or a transgrade approach. The lateral anterograde approach inserts the lead epidurally lower than the target, and then advances the lead in an anterograde direction (toward the head) until the lead is at the targeted nerve root. The lateral retrograde approach may be used to pass the lead closer to the DRG for selective root stimulation by inserting the lead epidurally above the target, and then advancing the lead in a retrograde direction (away from the head) to the targeted nerve root. The sacral hiatus approach introduces the introducer needle through the sacral hiatus into the epidural space and advanced in an anterograde direction (toward the head) to the targeted nerve root. Upon reaching the targeted nerve, the lead may be steered through the foramen to position extraforaminal, foraminal, and intraspinal electrodes along the targeted nerve root. The transgrade approach accesses the contralateral interlaminar space and steers the lead out of the opposite foramen to position extraforaminal, foraminal, and intraspinal electrodes along the targeted nerve root.

Stimulation of DR tissue may be useful to treat focal pain as it may provide the desired coverage for the pain without the stimulation spill over that can cause undesired effects in other areas of the body. Stimulation of DR tissue may be useful for delivering sub-perception therapy, which avoids the paresthesia that accompanies conventional SCS therapy when the large sensory DC nerve fibers are activated. Patients sometimes report these sensations to be unwanted. Sub-perception therapy may effectively treat pain without the patient sensing the delivery of the modulation field (e.g. paresthesia). Selective modulation of DR tissue, for either sub-perception therapy or to treat focal pain, may be delivered at higher frequencies (e.g. over 1,500 Hz such as frequencies within a range of 2 kHz to 20 kHz) or may be delivered at lower frequencies (e.g. at or less than 1,500 Hz such as frequencies at or less than 1,200 Hz, frequencies at or less than 1,000 Hz, frequencies at or less than 500 Hz, frequencies at or less than 350 Hz, or at or less than 130 Hz. The selective modulation may be delivered at low frequencies (e.g. as low as 2 Hz) or may be delivered even without pulses (e.g. 0 Hz). By way of example and not limitation, the selective modulation may be delivered within a frequency range selected from the following frequency ranges: 2 Hz to 1,200 Hz; 2 Hz to 1,000 Hz, 2 Hz to 500 Hz; 2 Hz to 350 Hz; or 2 Hz to 130 Hz. Systems may be developed to raise the lower end of any these ranges from 2 Hz to other frequencies such as, by way of example and not limitation, 10 Hz, 20 Hz, 50 Hz or 100 Hz. By way of example and not limitation, it is further noted that the selective modulation may be delivered with a duty cycle, in which stimulation (e.g. a train of pulses) is delivered during a Stimulation ON portion of the duty cycle, and is not delivered during a Stimulation OFF portion of the duty cycle. By way of example and not limitation, the duty cycle may be about 10%±5%, 20%±5%, 30%±5%, 40%±5%, 50%±5% or 60%±5%. For example, a burst of pulses for 10 ms during a Stimulation ON portion followed by 15 ms without pulses corresponds to a 40% duty cycle. Some waveforms may combine lower frequency pulses and higher frequency pulses into a more complex waveform (e.g. bursts of higher frequency pulses interleaved between one or more pulses delivered at a lower frequency. The waveform may have a regular pattern of pulses that repeats at regular intervals between pulses or regular intervals between burst of pulses. The waveform may have an irregular pattern of pulse that includes different intervals between pulses and/or different intervals between burst of pulses. The waveform may comprise rectilinear pulses, or may include other morphological shapes that are not rectilinear.

Figure 2:
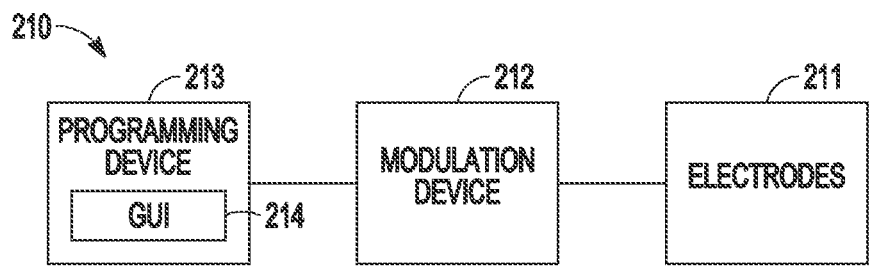
FIG. 2 illustrates, by way of example, an embodiment of a neuromodulation system.

FIG. 2 illustrates an embodiment of a neuromodulation system. The illustrated system 210 includes electrodes 211, a modulation device 212, and a programming device 213. The electrodes 211 are configured to be placed on or near one or more neural targets in a patient, such as one or more dorsal nerve roots. The modulation device 212 is configured to be electrically connected to electrodes 211 and deliver neuromodulation energy, such as in the form of electrical pulses or other waveform shape, to the one or more neural targets though electrodes 211. The modulation device 212 may be an implantable device or an external device with leads percutaneously inserted to be positioned to stimulate a dorsal root. The delivery of the neuromodulation is controlled by using a plurality of modulation parameters, such as modulation parameters specifying the electrical pulses and a selection of electrode(s) to function as anode(s) and a selection of electrode(s) to function as cathode(s) through which each of the electrical pulses is delivered. The modulation parameter may also include the fractional distribution of energy (e.g. current) provided across the anodic electrode (s) and cathodic electrode(s). In various embodiments, at least some parameters of the plurality of modulation parameters are programmable by a user, such as a physician or other caregiver. The programming device 213 provides the user with accessibility to the user-programmable parameters. In various embodiments, the programming device 213 is configured to be communicatively coupled to modulation device via a wired or wireless link. In various embodiments, the programming device 213 includes a graphical user interface (GUI) 214 that allows the user to set and/or adjust values of the user-programmable modulation parameters.

Figure 3:
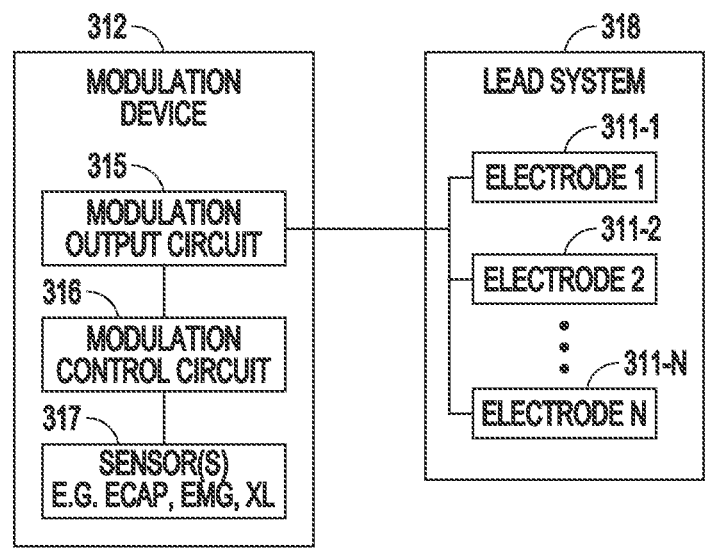
FIG. 3 illustrates, by way of example, an embodiment of a modulation device, such as may be implemented in the neuromodulation system of FIG. 2.

FIG. 3 illustrates an embodiment of a neuromodulation device 312, such as may be implemented in the neuromodulation system 210 of FIG. 2. The illustrated embodiment of the neuromodulation device 312 includes a neuromodulation output circuit 315 and a neuromodulation control circuit 316. Those of ordinary skill in the art will understand that the neuromodulation device 312 may include additional components such as sensing circuitry for patient monitoring and/or feedback control of the therapy, telemetry circuitry and power. The neuromodulation output circuit 315 produces and delivers neuromodulation pulses. The neuromodulation control circuit 316 controls the delivery of the neuromodulation pulses using the plurality of neuromodulation parameters. The combination of the neuromodulation output circuit 315 and neuromodulation control circuit 316 may collectively be referred to as a pulse generator. The lead system 317 includes one or more leads each configured to be electrically connected to neuromodulation device 312 and a plurality of electrodes 311-1 to 311-N (where N>2) distributed in an electrode arrangement using the one or more leads. Each lead may have an electrode array consisting of two or more electrodes, which also may be referred to as contacts. Multiple leads may provide multiple electrode arrays to provide the electrode arrangement. Each electrode is a single electrically conductive contact providing for an electrical interface between neuromodulation output circuit 315 and tissue of the patient. The neuromodulation pulses are each delivered from the neuromodulation output circuit 315 through a set of electrodes selected from the electrodes 311-1 to 311-N. The number of leads and the number of electrodes on each lead may depend on, for example, the distribution of target(s) of the neuromodulation and the need for controlling the distribution of electric field at each target. In one embodiment, by way of example and not limitation, the lead system includes two leads each having eight electrodes. Some embodiments may use a lead system that includes one or more leads of the same or different types such as percutaneous leads, linear paddles, multiple-column paddles, or directional leads, among others.

The neuromodulation system may be configured to modulate spinal target tissue or other neural tissue. The configuration of electrodes used to deliver electrical pulses to the targeted tissue constitutes an electrode configuration, with the electrodes capable of being selectively programmed to act as anodes (positive), cathodes (negative), or left off (zero). In other words, an electrode configuration represents the polarity being positive, negative, or zero. An electrical waveform may be controlled or varied for delivery using electrode configuration(s). The electrical waveforms may be analog or digital signals. In some embodiments, the electrical waveform includes pulses. The pulses may be delivered in a regular, repeating pattern, or may be delivered using complex patterns of pulses that appear to be irregular. Other parameters that may be controlled or varied include the amplitude, pulse width, and rate (or frequency) of the electrical pulses. Each electrode configuration, along with the electrical pulse parameters, can be referred to as a "neuromodulation parameter set." Each set of neuromodulation parameters, including fractionalized current distribution to the electrodes (as percentage cathodic current, percentage anodic current, or off), may be stored and combined into a neuromodulation program that can then be used to modulate multiple regions within the patient.

The number of electrodes available combined with the ability to generate a variety of complex electrical pulses, presents a huge selection of neuromodulation parameter sets to the clinician or patient. For example, if the neuromodulation system to be programmed has sixteen electrodes, millions of neuromodulation parameter sets may be available for programming into the neuromodulation system. Furthermore, for example SCS systems may have 32 electrodes (plus an additional electrode of the "can" or enclosure of the device) which exponentially increases the number of neuromodulation parameters sets available for programming. To facilitate such selection, the clinician generally programs the neuromodulation parameters sets through a computerized programming system to allow the optimum neuromodulation parameters to be determined based on patient feedback or other means and to subsequently program the desired neuromodulation parameter sets.

Patient paresthesia perception may be used to program SCS therapy, such as by selecting or determining an appropriate neuromodulation parameter set. The paresthesia induced by neuromodulation and perceived by the patient may be located in approximately the same places of the patient body where pain is sensed and thus the target site of treatment. Conventionally, when leads are implanted within the patient, an operating room (OR) mapping procedure may be performed to apply neuromodulation to test placement of the leads and/or electrodes, thereby assuring that the leads and/or electrodes are implanted in effective locations within the patient.

Once the leads are correctly positioned, a fitting procedure, which may be referred to as a navigation session, may be performed to program the external control device, and if applicable the neuromodulation device, with a set of neuromodulation parameters that best addresses the painful site. Thus, the navigation session may be used to pinpoint the volume of activation (VOA) or areas correlating to the pain. The procedure may be implemented to target the tissue during implantation, or after implantation should the leads gradually or unexpectedly move that would otherwise relocate the neuromodulation energy away from the target site. By reprogramming the neuromodulation device (typically by independently varying the neuromodulation energy on the electrodes), the VOA can often be moved back to the effective pain site without having to re-operate on the patient in order to reposition the lead and its electrode array. According to various embodiments discussed in this document, in addition to the information of dermatomal coverage such as correspondence between body sites of pain and body sites of induced paresthesia, one or more of patient information such as feedback on the induced paresthesia or patient perception thresholds may be used to optimize the target neuromodulation field. This may not only improve the neuromodulation precision and thus better therapeutic outcome, but may also save a system operator's time and ease the burden of programming a neuromodulation system.

Figure 4:
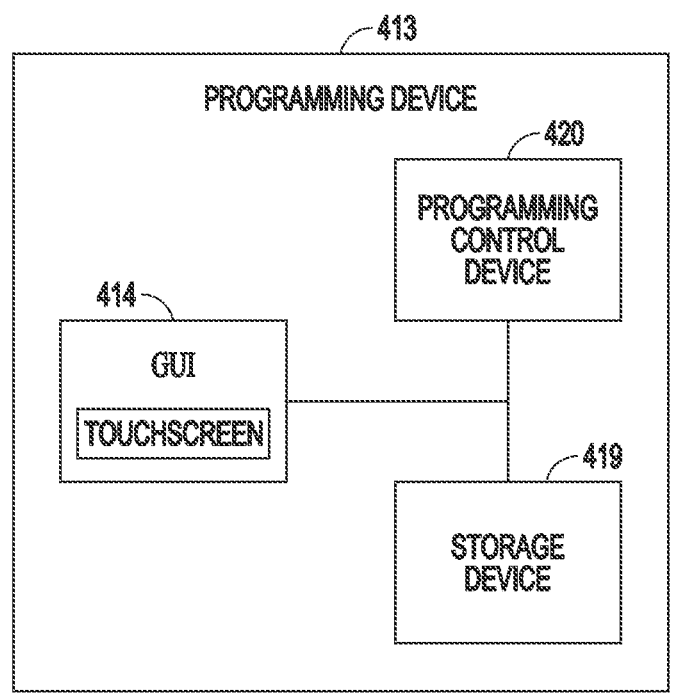
FIG. 4 illustrates, by way of example, an embodiment of a programming device, such as may be implemented as the programming device in the neuromodulation system of FIG. 2.

FIG. 4 illustrates an embodiment of a programming device 413, such as may be implemented as the programming device 213 in the neuromodulation system of FIG. 2. The programming device 413 includes a storage device 419, a programming control circuit 420, and a GUI 414. The programming control circuit 420 generates the plurality of modulation parameters that controls the delivery of the neuromodulation pulses according to the pattern of the neuromodulation pulses. In various embodiments, the GUI 414 includes any type of presentation device, such as interactive or non-interactive screens, and any type of user input devices that allow the user to program the modulation parameters, such as touchscreen, keyboard, keypad, touchpad, trackball, joystick, and mouse. The storage device 419 may store, among other things, modulation parameters to be programmed into the modulation device. The modulation parameters may be organized into one or more sets of modulation parameters. The programming device 413 may transmit the plurality of modulation parameters to the modulation device. In some embodiments, the programming device 413 may transmit power to the modulation device. The programming control circuit 420 may generate the plurality of modulation parameters. In various embodiments, the programming control circuit 420 may check values of the plurality of modulation parameters against safety rules to limit these values within constraints of the safety rules.

In various embodiments, circuits of neuromodulation, including its various embodiments discussed in this document, may be implemented using a combination of hardware, software and firmware. For example, the circuit of GUI, modulation control circuit, and programming control circuit, including their various embodiments discussed in this document, may be implemented using an application-specific circuit constructed to perform one or more particular functions or a general-purpose circuit programmed to perform such function(s). Such a general-purpose circuit includes, but is not limited to, a microprocessor or a portion thereof, a microcontroller or portions thereof, and a programmable logic circuit or a portion thereof.

Figure 5:
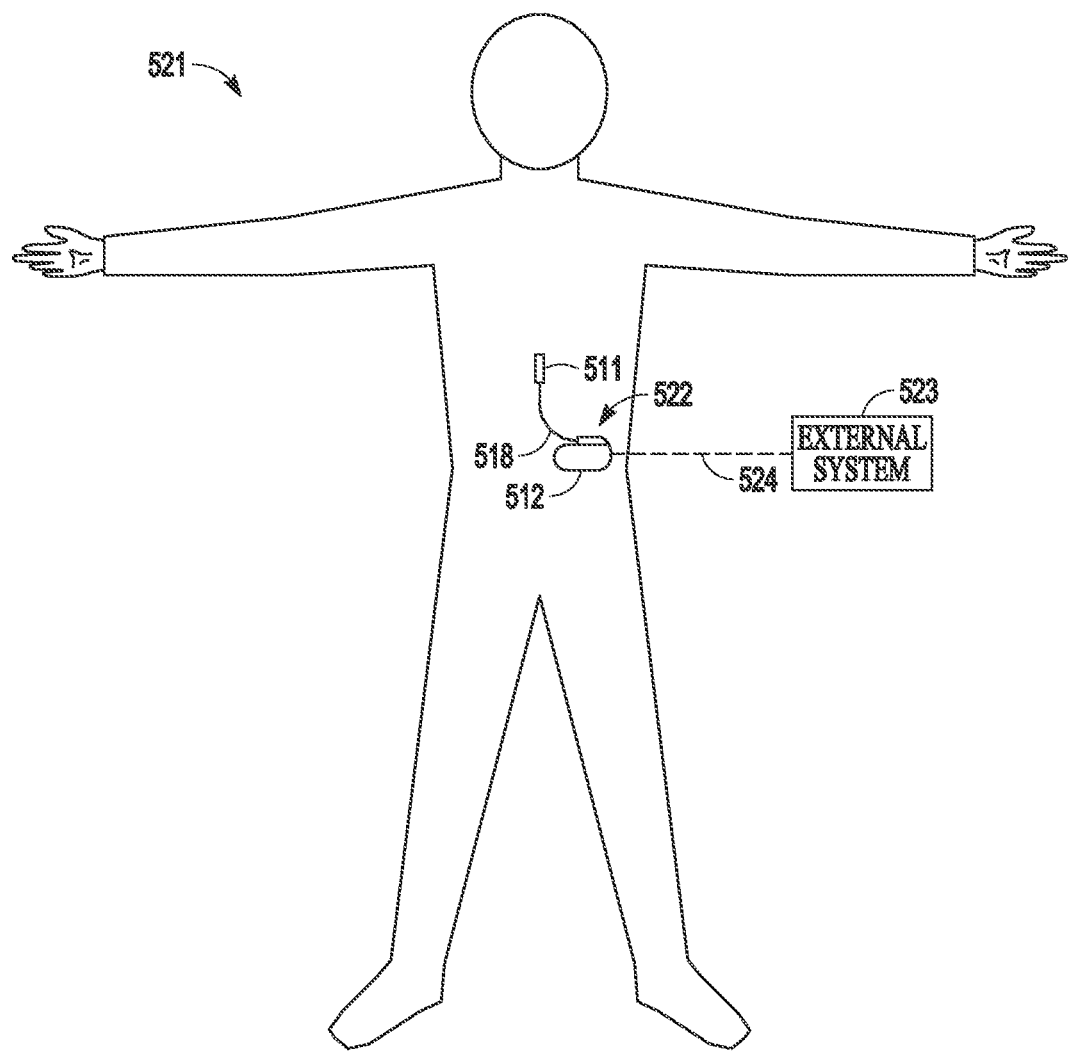
FIG. 5 illustrates, by way of example, an implantable neuromodulation system and portions of an environment in which system may be used.

FIG. 5 illustrates, by way of example, an implantable neuromodulation system and portions of an environment in which system may be used. The system is illustrated for implantation near the spinal cord. The system 521 includes an implantable system 522, an external system 523, and a telemetry link 524 providing for wireless communication between implantable system 522 and external system 523. The implantable system is illustrated as being implanted in the patient's body. The implantable system 522 includes an implantable modulation device (also referred to as an implantable pulse generator, or IPG) 512, a lead system 518, and electrodes 511. The lead system 518 includes one or more leads each configured to be electrically connected to the modulation device 512 and a plurality of electrodes 511 distributed in the one or more leads. In various embodiments, the external system 523 includes one or more external (non-implantable) devices each allowing a user (e.g. a clinician or other caregiver and/or the patient) to communicate with the implantable system 522. In some embodiments, the external system 523 includes a programming device intended for a clinician or other caregiver to initialize and adjust settings for the implantable system 522 and a remote control device intended for use by the patient. For example, the remote control device may allow the patient to turn a therapy on and off and/or adjust certain patient-programmable parameters of the plurality of modulation parameters. The external system 523 may include other local or remote servers or computer systems accessible through a variety of network(s).

The neuromodulation lead(s) of the lead system 518 may be placed proximate to (e.g. such as resting near, or upon the dura, adjacent to) the dorsal root tissue to be stimulated. Due to the lack of space near the location of the implanted neuromodulation lead(s), the implantable modulation device 512 may be implanted in a surgically-made pocket either in the abdomen or above the buttocks, or may be implanted in other locations of the patient's body. The lead extension(s) may be used to facilitate the implantation of the implantable modulation device 512 away from the exit point of the neuromodulation lead(s).

Figure 6:
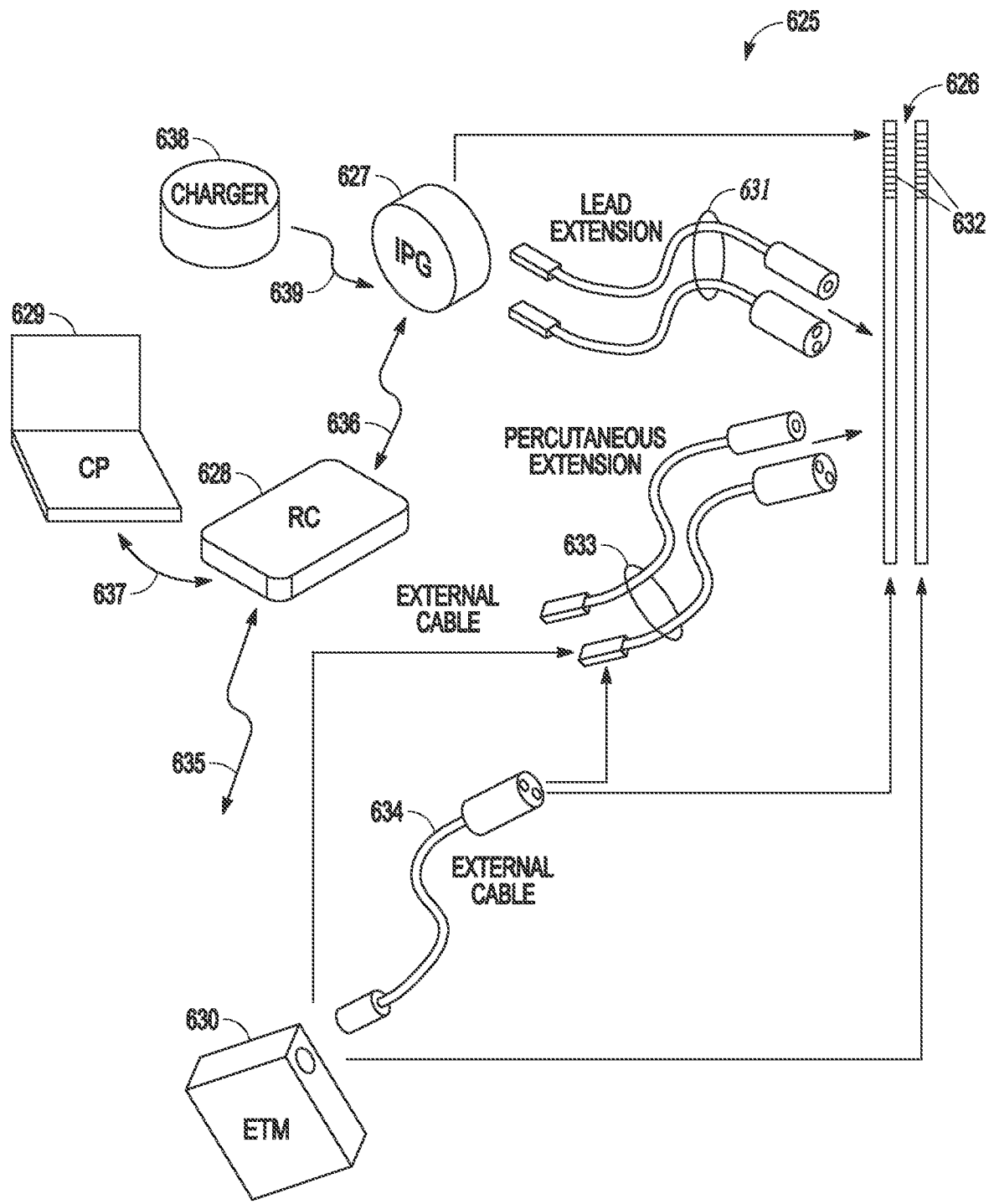
FIG. 6 illustrates, by way of example, an embodiment of a Spinal Cord Stimulation (SCS) system.

FIG. 6 illustrates, by way of example, an embodiment of a SCS system, which also may be referred to as a Spinal Cord Modulation system. The SCS system 625 may generally include a one or more (illustrated as two) of implantable neuromodulation leads 626, an implantable pulse generator (IPG) 627, an external remote controller RC 628, a clinician's programmer (CP) 629, and an external trial modulator (ETM) 630. The IPG 627 may be physically connected via one or more percutaneous lead extensions 631 to the neuromodulation lead(s) 626, which carry a plurality of electrodes 632. The electrodes, when implanted in a patient, form an electrode arrangement. As illustrated, the neuromodulation leads 626 may be percutaneous leads with the electrodes arranged in-line along the neuromodulation leads. Any suitable number of neuromodulation leads can be provided, including only one, as long as the number of electrodes is greater than two (including the IPG case function as a case electrode) to allow for lateral steering of the current. Alternatively, a surgical paddle lead can be used in place of one or more of the percutaneous leads. The IPG 627 includes pulse generation circuitry that delivers electrical modulation energy in the form of a pulsed electrical waveform (i.e., a temporal series of electrical pulses) to the electrodes in accordance with a set of modulation parameters.

The ETM 630 may also be physically connected via the percutaneous lead extensions 633 and external cable 634 to the neuromodulation lead(s) 626. The ETM 630 may have similar pulse generation circuitry as the IPG 627 to deliver electrical modulation energy to the electrodes accordance with a set of modulation parameters. The ETM 630 is a non-implantable device that may be used on a trial basis after the neuromodulation leads 626 have been implanted and prior to implantation of the IPG 627, to test the responsiveness of the modulation that is to be provided. Functions described herein with respect to the IPG 627 can likewise be performed with respect to the ETM 630.

The RC 628 may be used to telemetrically control the ETM 630 via a bi-directional RF communications link 635. The RC 628 may be used to telemetrically control the IPG 627 via a bi-directional RF communications link 636. Such control allows the IPG 627 to be turned on or off and to be programmed with different modulation parameter sets. The IPG 627 may also be operated to modify the programmed modulation parameters to actively control the characteristics of the electrical modulation energy output by the IPG 627. A clinician may use the CP 629 to program modulation parameters into the IPG 627 and ETM 630 in the operating room and in follow-up sessions.

The CP 629 may indirectly communicate with the IPG 627 or ETM 630, through the RC 628, via an IR communications link 637 or other link. The CP 629 may directly communicate with the IPG 627 or ETM 630 via an RF communications link or other link (not shown). The clinician detailed modulation parameters provided by the CP 629 may also be used to program the RC 628, so that the modulation parameters can be subsequently modified by operation of the RC 628 in a stand-alone mode (i.e., without the assistance of the CP 629). Various devices may function as the CP 629. Such devices may include portable devices such as a lap-top personal computer, mini-computer, personal digital assistant (PDA), tablets, phones, or a remote control (RC) with expanded functionality. Thus, the programming methodologies can be performed by executing software instructions contained within the CP 629. Alternatively, such programming methodologies can be performed using firmware or hardware. In any event, the CP 629 may actively control the characteristics of the electrical modulation generated by the IPG 627 to allow the desired parameters to be determined based on patient feedback or other feedback and for subsequently programming the IPG 627 with the desired modulation parameters. To allow the user to perform these functions, the CP 629 may include user input device (e.g., a mouse and a keyboard), and a programming display screen housed in a case. In addition to, or in lieu of, the mouse, other directional programming devices may be used, such as a trackball, touchpad, joystick, touch screens or directional keys included as part of the keys associated with the keyboard. An external device (e.g. CP) may be programmed to provide display screen(s) that allow the clinician to, among other functions, select or enter patient profile information (e.g., name, birth date, patient identification, physician, diagnosis, and address), enter procedure information (e.g., programming/follow-up, implant trial system, implant IPG, implant IPG and lead(s), replace IPG, replace IPG and leads, replace or revise leads, explant, etc.), generate a pain map of the patient, define the configuration and orientation of the leads, initiate and control the electrical modulation energy output by the neuromodulation leads, and select and program the IPG with modulation parameters, including electrode selection, in both a surgical setting and a clinical setting. The display screen(s) may be used to suggest the electrode(s) for use to stimulate a targeted dorsal root. The external device(s) (e.g. CP and/or RC) may be configured to communicate with other device(s), including local device(s) and/or remote device(s). For example, wired and/or wireless communication may be used to communicate between or among the devices.

An external charger 638 may be a portable device used to transcutaneously charge the IPG via a wireless link such as an inductive link 636. Once the IPG has been programmed, and its power source has been charged by the external charger or otherwise replenished, the IPG may function as programmed without the RC or CP being present.

Figure 7:
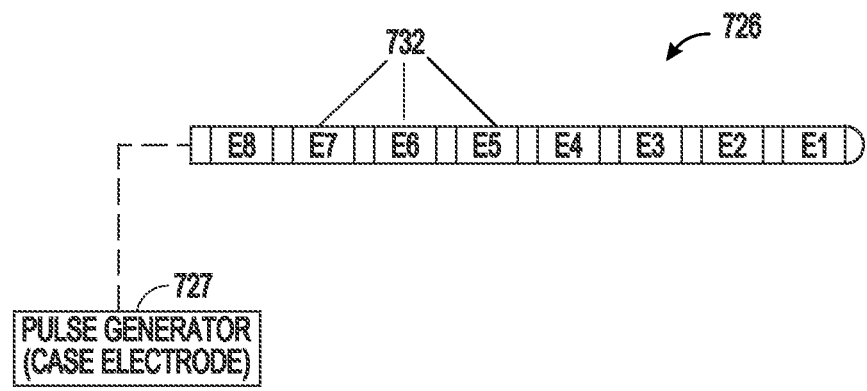
FIG. 7 illustrates, by way of example, some features of the neuromodulation lead and a waveform generator.

FIG. 7 illustrates, by way of example, some features of the neuromodulation leads 726 and a pulse generator 727. The pulse generator 727 may be an implantable device (IPG) or may be an external device such as may be used to test the electrodes during an implantation procedure. In the illustrated example, the neuromodulation lead has eight electrodes 732 (labeled E1-E8). The actual number and shape of leads and electrodes may vary for the intended application. An implantable pulse generator (IPG) may include an outer case for housing the electronic and other components. The outer case may be composed of an electrically conductive, biocompatible material, such as titanium, that forms a hermetically-sealed compartment wherein the internal electronics are protected from the body tissue and fluids. In some cases, the outer case may serve as an electrode (e.g. case electrode). The IPG may include electronic components, such as a controller/processor (e.g., a microcontroller), memory, a battery, telemetry circuitry, monitoring circuitry, modulation output circuitry, and other suitable components known to those skilled in the art. The microcontroller executes a suitable program stored in memory, for directing and controlling the neuromodulation performed by IPG. Electrical modulation energy is provided to the electrodes in accordance with a set of modulation parameters programmed into the pulse generator. The electrical modulation energy may be in the form of a pulsed electrical waveform. Such modulation parameters may comprise electrode combinations, which define the electrodes that are activated as anodes (positive), cathodes (negative), and turned off (zero), percentage of modulation energy assigned to each electrode (fractionalized electrode configurations), and electrical pulse parameters, which define the pulse amplitude (which may be measured in milliamps or volts depending on whether the pulse generator supplies constant current or constant voltage to the electrode array), pulse width (which may be measured in microseconds), pulse rate (which may be measured in pulses per second), and burst rate (which may be measured as the modulation on duration X and modulation off duration Y). Electrodes that are selected to transmit or receive electrical energy are referred to herein as "activated," while electrodes that are not selected to transmit or receive electrical energy are referred to herein as "non-activated."

Electrical modulation occurs between or among a plurality of activated electrodes, one of which may be the IPG case. The system may be capable of transmitting modulation energy to the tissue in a monopolar or multipolar (e.g., bipolar, tripolar, etc.) fashion. Monopolar modulation occurs when a selected one of the lead electrodes is activated along with the case of the IPG, so that modulation energy is transmitted between the selected electrode and case. Any of the electrodes E1-E8 and the case electrode may be assigned to up to k possible groups or timing "channels." In one embodiment, k may equal four. The timing channel identifies which electrodes are selected to synchronously source or sink current to create an electric field in the tissue to be stimulated. Amplitudes and polarities of electrodes on a channel may vary. In particular, the electrodes can be selected to be positive (anode, sourcing current), negative (cathode, sinking current), or off (no current) polarity in any of the k timing channels. The IPG may be operated in a mode to deliver electrical modulation energy that is therapeutically effective and causes the patient to perceive delivery of the energy (e.g. therapeutically effective to relieve pain with perceived paresthesia), and may be operated in a sub-perception mode to deliver electrical modulation energy that is therapeutically effective and does not cause the patient to perceive delivery of the energy (e.g. therapeutically effective to relieve pain without perceived paresthesia).

The IPG may be configured to individually control the magnitude of electrical current flowing through each of the electrodes. For example, a current generator may be configured to selectively generate individual current-regulated amplitudes from independent current sources for each electrode. In some embodiments, the pulse generator may have voltage regulated outputs. While individually programmable electrode amplitudes are desirable to achieve fine control of the shape and size of the resulting modulation field, a single output source switched across electrodes may also be used, although with less fine control in programming. Neuromodulators may be designed with mixed current and voltage regulated devices.

Figure 8:
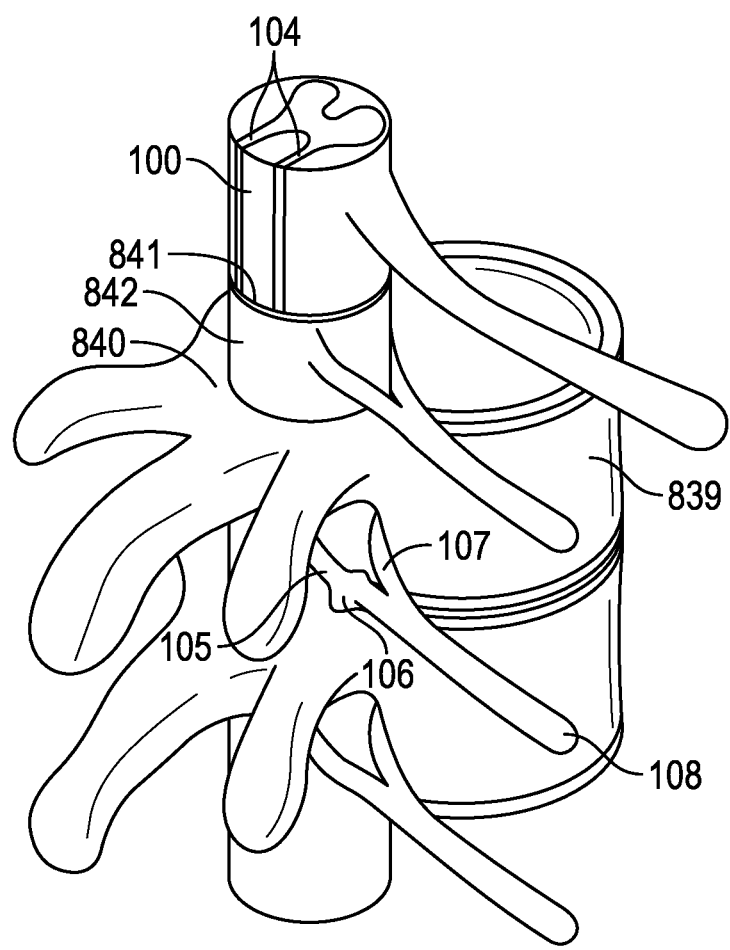
FIG. 8 illustrates a partial view of both neuroanatomy and bony anatomy of the spinal column.

FIG. 8 illustrates, for the convenience of the reader, a partial view of both neuroanatomy and bony anatomy of the spinal column. The neuroanatomy includes the spinal cord 100 such as was illustrated in FIGS. 1A-1B. The neuroanatomy also includes the dorsal horn (DH) 104, the dorsal root 105, the DRG 106, the ventral root 107, and the mixed spinal nerve root 108. The bony anatomy refers to the vertebrae that includes a vertebral body 839 and a bony ring 840 attached to the vertebral body 839. The stacked vertebrae provide a vertebral canal that protects the spinal cord 100. Nerve roots branch off and exit the spine on both sides through spaces ("intervertebral foramen") between the vertebra. The spinal cord is surrounded by dura matter 841, which holds spinal fluid that surrounds the spinal cord 100. The space between the walls and the dura matter of the vertebral canal is referred to as epidural space 842.

FIGS. 9A-9C illustrate a transverse top view, a coronal side view and an angled view, respectively, of the spinal cord 100, the dorsal root 105, the DRG 106, the ventral root 107 and the mixed spinal nerve root 108. FIG. 9A also illustrates bone 943, fat 944, dura 945 and cerebrospinal fluid 946.

Figure 10B:
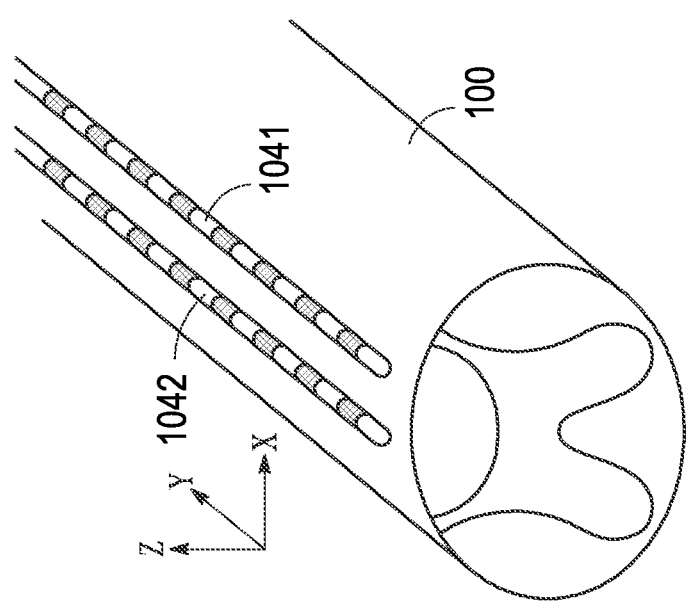
FIGS. 10A-10G illustrate, by way of example, various examples of lead placement on a spinal cord.
Figure 10A:
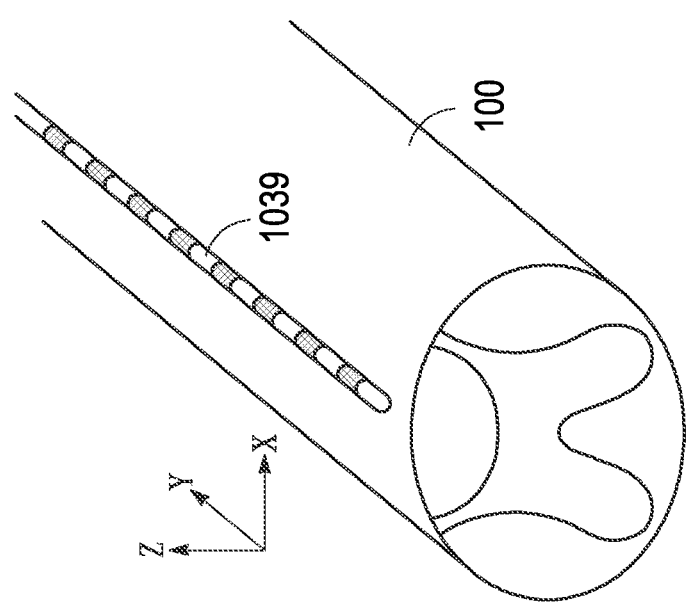

FIGS. 10A-10G are schematic views of embodiments of neuromodulation lead placement on a patient's spinal cord. Specifically, FIG. 10A is a schematic view of a single electrical neuromodulation lead 1039 implanted over approximately the longitudinal midline of the spinal cord 100. It is understood that additional leads or lead paddle(s) may be used, such as may be used to provide a wider electrode arrangement and/or to provide the electrodes closer to dorsal horn elements, and that these electrode arrays also may implement fractionalized current. FIG. 10B illustrates an embodiment where two electrical neuromodulation leads are implanted near the spinal cord. A first electrical neuromodulation lead 1041 is implanted more laterally with respect to the spinal cord, thereby placing it proximate the dorsal horn of the spinal cord. A second electrical neuromodulation lead 1042 is implanted more medially with respect to the spinal cord, thereby placing it proximate the dorsal column of the spinal cord 100.

Placement of the lead more proximal to the DH than the DC may be desirable to preferentially stimulate DH elements over DC neural elements for a sub-perception therapy. Lead placement may also enable preferential neuromodulation of dorsal roots over other neural elements. Any other plurality of leads or a multiple column paddle lead can also be used. Longitudinal component of the electrical field is directed along the y-axis depicted in each of FIGS. 10A-10B, and a transverse component of the electrical field is directed along the x-axis depicted in each of FIGS. 10A-10B. Some embodiments may include directional leads with one or more directional electrodes. A directional electrode may extend less than 360 degrees about the circumference of a lead body. For example, a row of two or more directional electrodes (e.g. "segmented electrodes") may be positioned along the circumference of the lead body. Activating select ones of the segmented electrodes may help extend and shape the field in a preferred direction.

Figure 10C:
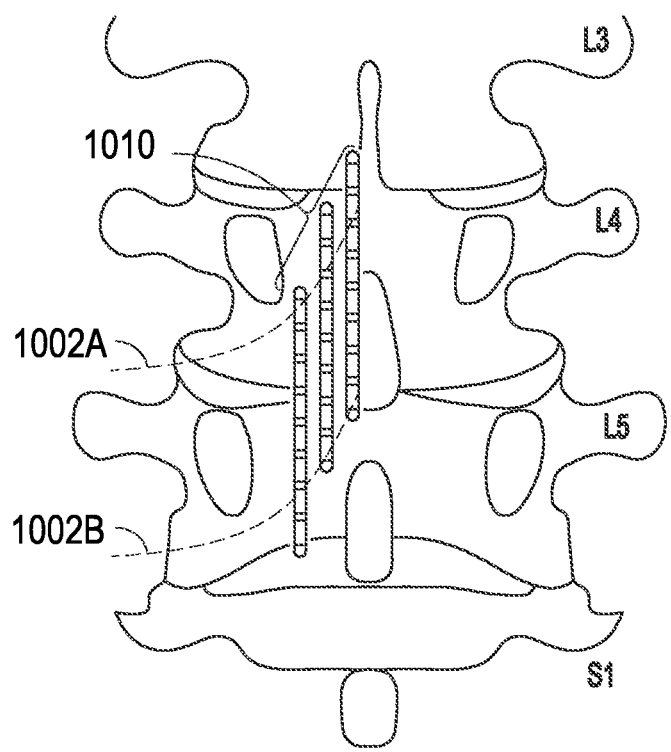
Figure 10D:
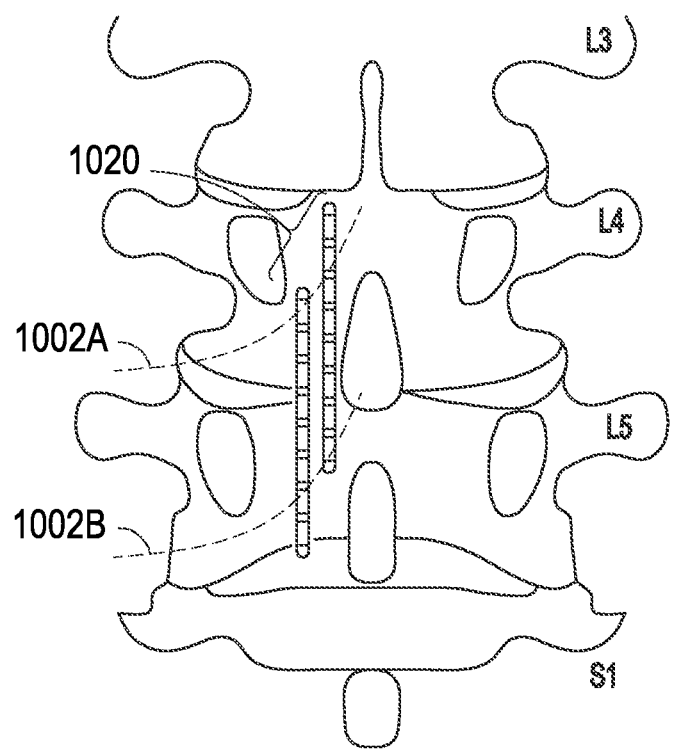
Figure 10F:
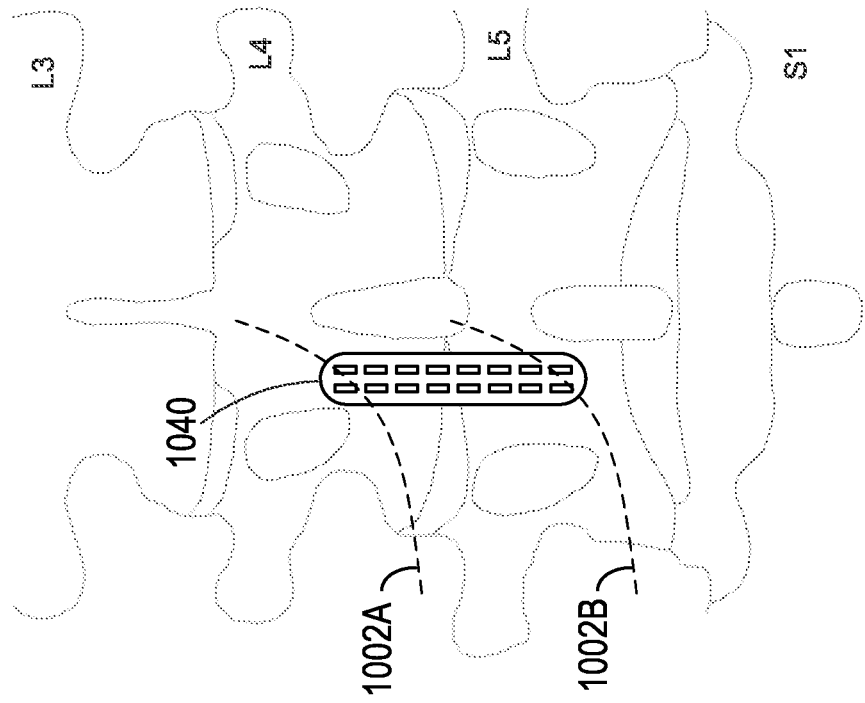
Figure 10E:
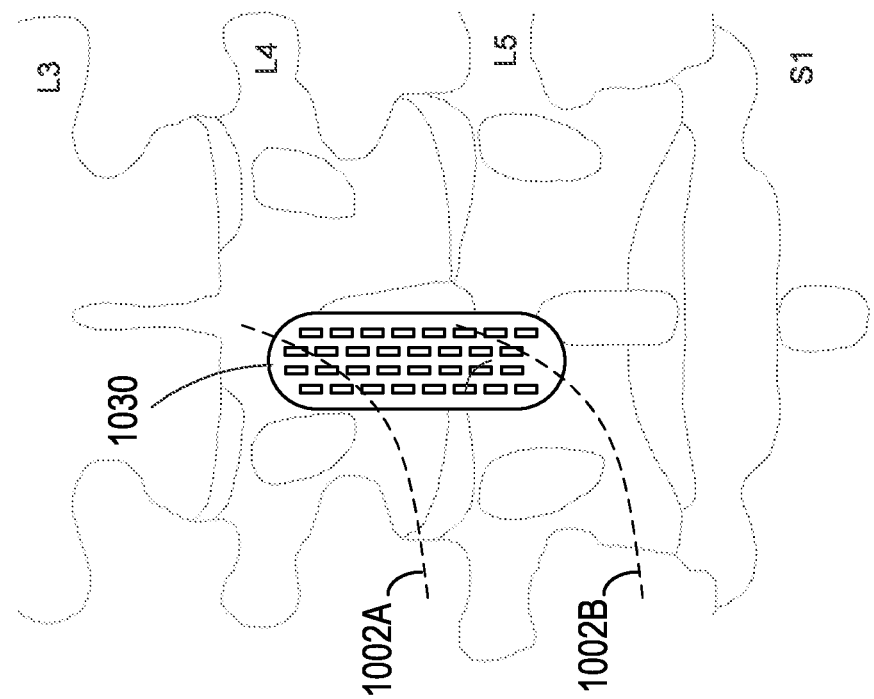
Figure 10G:
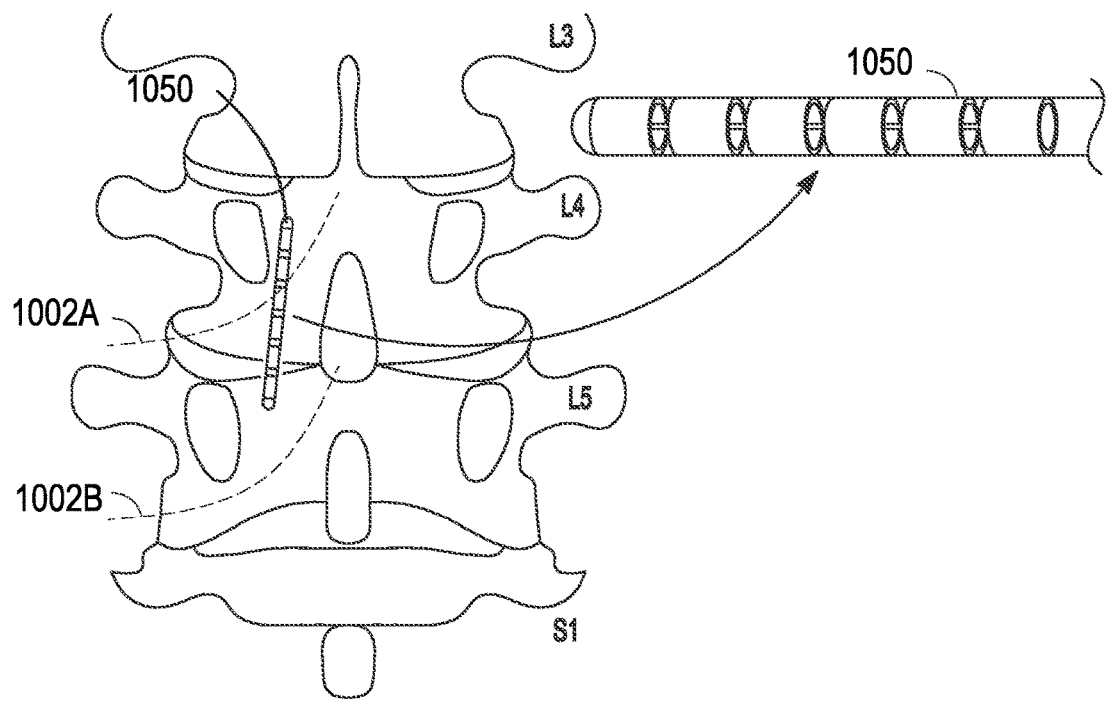

It is to be understood that additional neuromodulation leads or paddle(s) of the same or different types may be used, such as may be used to provide a wider electrode arrangement and/or to provide the electrodes closer to dorsal horn elements. In some examples, the neuromodulation leads or paddles maybe placed at regions more caudal to the end of the spinal cord, and the electrode arrays on the neuromodulation lead also may implement fractionalized current. FIGS. 10C-10G are schematic views of embodiments of neuromodulation lead placement on caudal regions of spinal column, such as the level of L3-L5 and S1, where virtually no spinal cord, but only dorsal roots, among other neural structures, are present. The neuromodulation leads or paddles may be placed medial or lateral to the spinal column, and proximal to one or more dorsal roots, and are configured to deliver modulation energy to the dorsal root fibers. In FIG. 10C, three percutaneous leads 1010 are positioned toward the left side of the spinal canal, and in FIG. 10D two percutaneous leads 1020 are positioned toward the left side of the spinal canal. In FIG. 10E, a single four-column paddle lead 1030 is positioned toward the left side of the spinal canal, and in FIG. 10F, a single two-column paddle lead 1040 is positioned toward the left side of the spinal canal. In FIG. 10G, a single percutaneous lead 1050 is positioned toward the left side of the spinal canal. In the illustrated example, the percutaneous lead 1050 includes multiple segmented electrodes that enable lateral control of the stimulation location via a single lead. Moreover, because the segmented electrodes are placed in close lateral proximity, they can be used to provide a high degree of lateral stimulation resolution.

While the examples illustrated in FIGS. 10C-10G show electrode lead placements to the left side of the spinal canal, these are by way of example and not limitation. In any of FIGS. 10C-10G, lead placements to the right side of the spinal canal may also be utilized. As can be seen from the figures, different types of leads with different numbers of electrodes and different electrode spacing (including different types than those shown) may be employed to provide dorsal root stimulation. These example lead placements differ from the placement of leads more proximal to the anatomical midline in traditional spinal cord stimulation (SCS) therapy.

The dorsal root trajectories 1002A and 1002B in FIGS. 10C-10G show that dorsal root fibers have different trajectories from dorsal column fibers, and they are not aligned with the anatomical midline. Accordingly, relative locations (e.g., lead entry angles) between the lead and the neural targets (e.g., dorsal column fibers or dorsal root fibers) can vary at different anatomical regions, as shown in FIGS. 10C-10G. When neuromodulation is specifically being targeted to dorsal root fibers, it is desirable to know the locations of the dorsal roots such that stimulation can be customized. The present document describes various embodiments of incorporating anatomy information of target neural tissue (e.g., trajectory of dorsal roots) and patient feedback to paresthesia into the process of stimulation field design, which may help improve the neuromodulation precision and thus better therapeutic outcome such as pain relief.

Figure 10H:
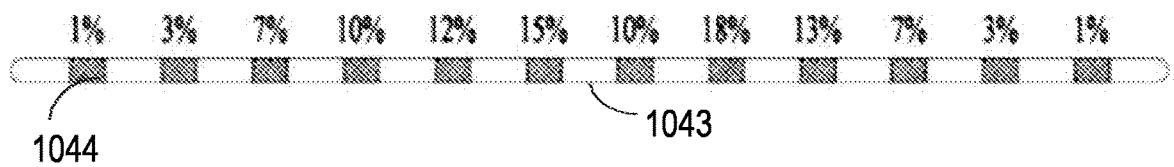
FIG. 10H illustrates, by way of example, fractionalization of anodic current delivered to the electrodes on an electrical neuromodulation lead.

FIG. 10H is a schematic view of an electrical neuromodulation lead 1043 showing an example of the fractionalization of the anodic current delivered to the electrodes on the electrical neuromodulation lead. These figures illustrate fractionalization using monopolar neuromodulation where a case electrode of the IPG is the only cathode, and carries 100% of the cathodic current. The fractionalization of the anodic current shown in FIG. 10E does not deliver an equal amount of current to each electrode 1044, because this embodiment takes into account electrode/tissue coupling differences, which are the differences in how the tissue underlying each electrode reacts to electrical neuromodulation. Also, the ends of the portion of the electrical neuromodulation lead include electrodes having lower gradient in the longitudinal direction. The magnitude of the electrical field tapers down at the ends of the electrical neuromodulation lead. Fractionalization of the current may accommodate variation in the tissue underlying those electrodes. The fractionalization across the electrical neuromodulation lead can vary in any manner as long as the total of fractionalized currents equals 100%.

Figure 11:
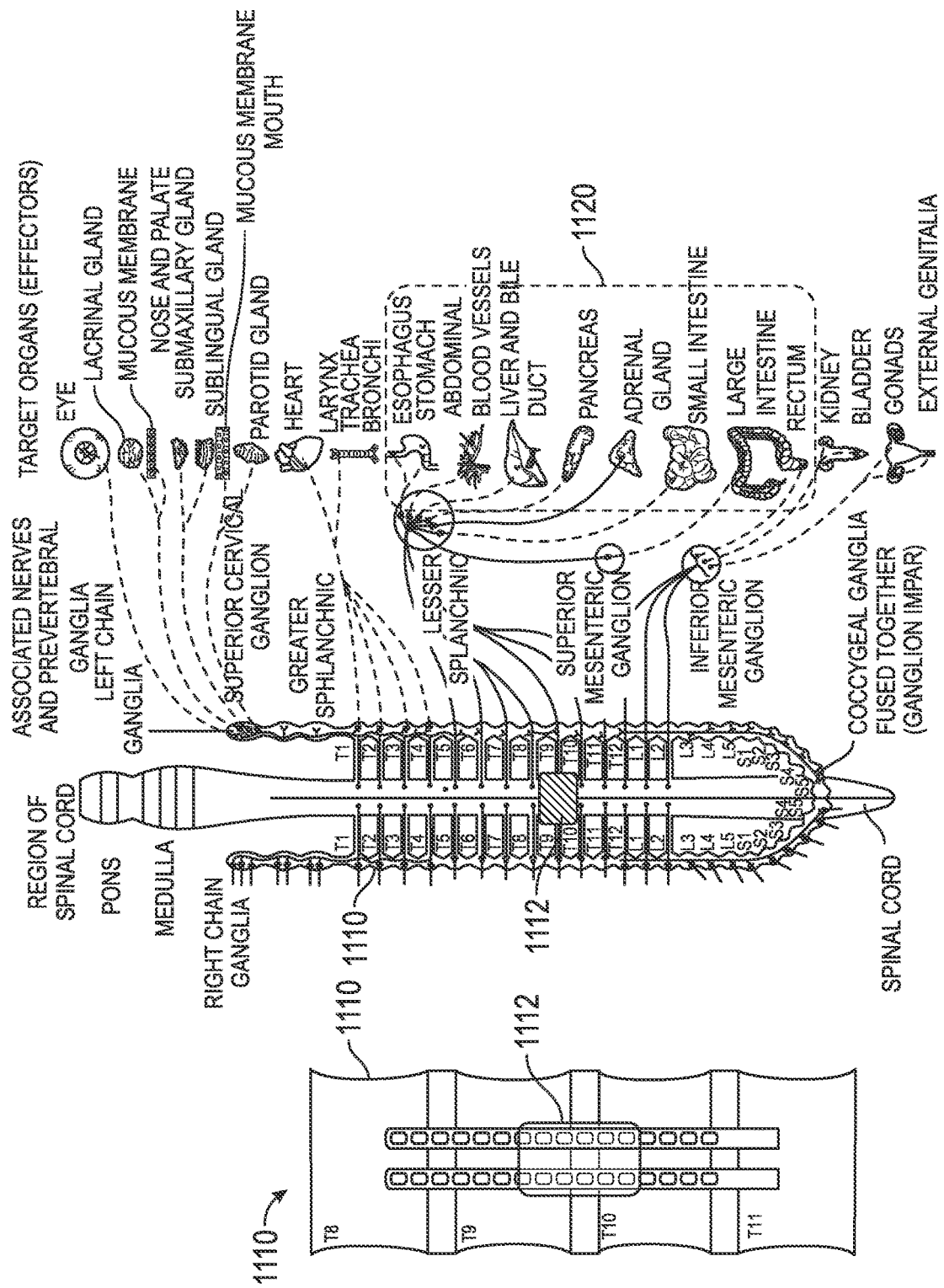
FIG. 11 is a diagram illustrating portions of the autonomic nervous system and spinal column origins of spinal nerves provided to and innervating various organs and tissues.

FIG. 11 is a diagram illustrating portions of the autonomic nervous system including spinal column origins (spinal levels) 1100 that provide spinal nerves to innervate various organs and tissues throughout the body, including, for example, blood vessels, stomach, intestine, liver, kidneys, bladder, genitals, lungs, pupils, heart, and sweat, salivary, and digestive glands. The innervating spinal nerves originate primarily from motor neurons in autonomic ganglia that are located in two paravertebral chains on either side of and parallel to the spinal cord. In patients receiving SCS for pain control via electrodes placed at neural targets at certain spinal cord levels or spinal nerves (e.g., dorsal roots or dorsal root ganglion), stimulation of such neural targets may produce side effects or symptoms specific to those organs or tissues innervated by the spinal nerves. As illustrated in FIG. 11, in a patient implanted with a SCS lead system 1110, stimulation energy (e.g., pulse train) delivered at selected electrodes such as electrodes 1112 at spinal levels T9-T10 may cause side effects or symptoms on organs 1120 innervated by the autonomous nerves originated from those spinal levels, including stomach, liver, adrenal glands, and small and large intestines. Patients may develop gastrointestinal symptoms such as constipation, diarrhea, gas and bloating, etc. in respective affected organs. Such correspondence between the anatomical systems, organs, and tissues and the spinal levels (i.e., spinal column origins of the nerves innervating the respective organs and tissues) can be utilized to titrate SCS configuration or dosing to alleviate the autonomic symptoms or side effects, or to treat or alleviate autonomic disorders including, for example, visceral pain originated from or related to internal organs or blood vessels.

Figure 12:
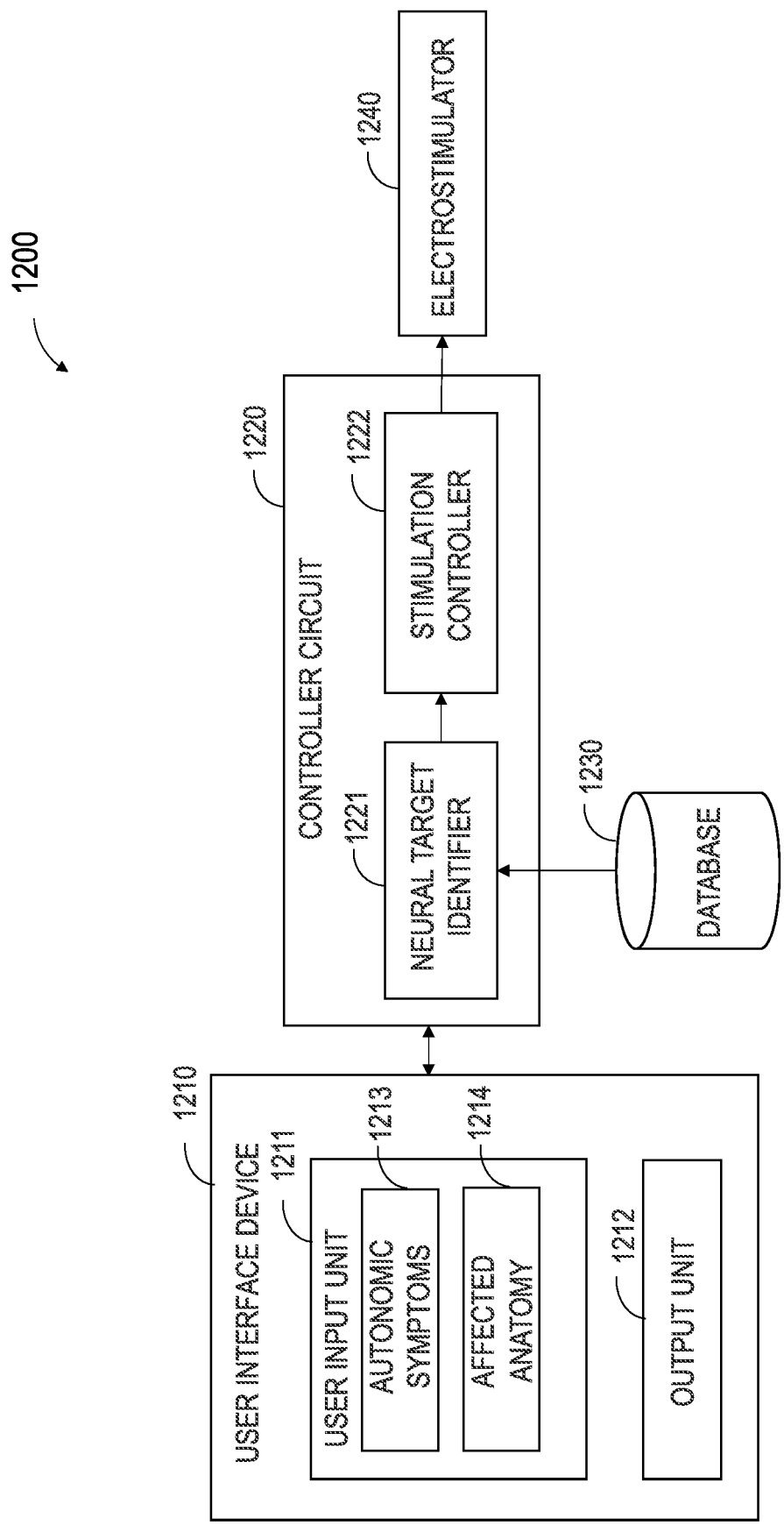
FIG. 12 is a block diagram illustrating, by way of example and not limitation, a neuromodulation system that can provide neurostimulation to a neural target to avoid or alleviate autonomic symptoms and side effects.

FIG. 12 is a block diagram illustrating, by way of example and not limitation, a neuromodulation system 1200 configured to provide or adjust neurostimulation to a neural target to avoid or alleviate autonomic symptoms and side effects. In an example, the system 1200 can provide spinal cord stimulation (SCS) at a spinal neural target. The SCS can be a part of pain management regimen, and the system 1200 can automatically, or with user intervention, optimize a stimulation setting to avoid or alleviate autonomic symptoms or side effects, while maintaining or improving pain control in the patient. In some examples, the system 1200 can titrate neurostimulation to treat or alleviate certain autonomic disorders including, for example, visceral pain originated from or related to internal organs or blood vessels.

The neuromodulation system 1200, which is an embodiment of the neuromodulation system 210, may include one or more of a user interface device 1210, a controller circuit 1220, a database 1230, and an electrostimulator 1240. Portions of the neuromodulation system 1200 may be implemented in the implantable system 521 or the external system 522. In an example, the user interface device 1210 and the controller circuit 1220 may be included in a programming device, such as the programing device 413.

The user interface device 1210, which can be an example of the programming device 213 or the programming device 413 as illustrated respectively in FIGS. 2 and 4, can allow a user (e.g., the patient, the physician managing the patient, or a device expert) to interact with the neuromodulation system 1200 by providing feedback on the SCS, and programming or modifying a stimulation setting. In an example, the user interface device 1210 can be a portable (e.g., handheld) device operable by the patient at his or her home without requiring extra clinic visits or consultation with a device expert. The portable device can be the RC 628 or a smartphone executing a specialized software application. The patient can provide feedback on the SCS, including pain relief and autonomic symptoms or side effects caused by or related to the existing SCS, adjust one or more SCS parameters to avoid or alleviate SCS-related side effects or symptoms while maintaining or improving pain relief effect. In another example, the user interface device 1210 can be a programmer device, such as the CP 629, that allows a physician to remotely review stimulation settings and treatment history, consult with the patient to obtain information including pain relief and SCS-related side effects or symptoms, perform remote programming of the electrostimulator 1240, or provide other treatment options to the patient.

As illustrated in FIG. 12, the user interface device 1210 can include a user input unit 1211 and an output unit 1212. The user input unit 1211 may include one or more user interface (UI) control elements operable by the user to provide information including autonomic symptoms 1213, and an identification of affected anatomy 1214 associated with the autonomic symptoms 1213. The autonomic symptoms 1213 may be related to conditions, dysfunctions, or symptoms associated with the autonomic nervous system (ANS). An example of such conditions or symptoms is visceral pain, which refers to pain originated from or related to internal organs or blood vessels, such as bladder pain, endometriosis, irritable bowel syndrome, and prostate pain, among others. Additionally or alternatively, the autonomic symptoms 1213 may result from or relate to neuromodulation therapy such as SCS delivered to the patient in accordance with a particular stimulation setting. In this document, a stimulation setting can be defined by a set of stimulation parameters with respective programmable or preset values. Examples of the stimulation parameters can include an electrode configuration (e.g., stimulation lead and electrode location, selection of active electrodes, designation of anode and cathode, and stimulation current or energy fractionalization across the electrodes), stimulation dose parameters (e.g., pulse width, frequency, pulse amplitude), stimulation pulse waveform, or an ON-OFF cycling of stimulation bursts (comprising a pulse train during an ON period, followed by a pulse-free period during an OFF period), among others. The affected anatomy 1214 may include certain systems (e.g., bodily, head, cardiovascular, gastrointestinal, or urological systems) or organs (e.g., heart, stomach, intestines, bladder, endometrium, skin) where the side effects or symptoms arise or persist. In some examples, the user may additionally provide information about the severity of an autonomic symptom or a side effect. The severity can take a numerical value (e.g., on a 1 to 5 scale) or a categorical value (e.g., "Mild", "Moderate", or "Severe"). The user may provide the autonomic symptoms 1213 and the affected anatomy 1214 in different formats, such as texts, graphs, or verbal descriptions, among others.

In some examples, the user may additionally provide pain data or feedback on pain relief by the existing SCS therapy via the user input unit 1211. The pain data or the feedback on pain relief may include identification of pain sites, distribution of the pain, intensity of pain at various pain sites, or temporal pattern such as persistence of the pain at various pain sites, a pain drawing with pain markings identifying the locations, intensities, patterns of pain, among other information. In some examples, the user may provide via the user input unit 1211 information about patient health or medical information, such as change in medication, physical activities, medical procedures received, among other information. Such additional information, along with the autonomic symptoms 1213 and the affected anatomy 1214, may be used by the neuromodulation system 1200 to optimize neurostimulation therapy.

The output unit 1212 can include a display to present textually or graphically the autonomic symptoms 1213 and the identification of the affected anatomy 1214, among other information provided by the user via the user input unit 1211. In an example, a pre-generated list of symptoms, in association with the systems, organs, or tissues likely to be affected based on lead placement and electrode locations, can be displayed to the user. The user can select applicable symptoms and/or the affected anatomy from the list, such as via a UI control element on the user input unit 1211.

In some examples, the user input unit 1211 may include tools (e.g., UI control elements) that allow a user (e.g., the patient) to program or modify the stimulation setting of existing CSC therapy, such as by adjusting values of one or more stimulation parameters, to improve pain relief effect and/or to avoid or alleviate the SCS-related side effects or symptoms. In some examples, the neuromodulation system 1200 may automatically determine an "optimal" or improved stimulation setting, or recommend adjustment of one or more stimulation parameters, based on the autonomic symptoms 1213 and the identified affected anatomy 1214 received from the user. The output unit 1212 may present to the user the "optimal" or improved stimulation setting or the recommended parameter adjustment. The user can accept, reject, or modify the stimulation setting via the user input unit 1211. Examples of the user interface device for receiving user input of autonomic symptoms and affected anatomy, and user programming of a stimulation setting or modification of a recommended stimulation setting, are discussed below with reference to FIGS. 14A-14D.

The controller circuit 1220, which is an example of the programming control circuit 420, can be communicatively coupled to the user interface device 1210, such as via a wireless communication link. The controller circuit 1220 can determine an "optimal" or improved stimulation setting (as defined by a set of stimulation parameters with respectively optimized values). A stimulation setting is "optimal" or improved in the sense that neurostimulation delivered in accordance therewith is likely to achieve a desired therapeutic outcome: avoiding or alleviating the side effects or symptoms associated with present stimulation, while maintaining or improving the pain relief effect. The controller circuit 1220 can include circuit sets comprising one or more other circuits or sub-circuits, such as a neural target identifier 1221 and a stimulation controller 1222. The circuits or sub-circuits may, alone or in combination, perform the functions, methods, or techniques described herein. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

In various examples, portions of the functions of the controller circuit 1220 may be implemented as a part of a microprocessor circuit. The microprocessor circuit can be a dedicated processor such as a digital signal processor, application specific integrated circuit (ASIC), microprocessor, or other type of processor for processing information including physical activity information. Alternatively, the microprocessor circuit can be a general purpose processor that can receive and execute a set of instructions of performing the methods or techniques described herein.

The neural target identifier 1221 may identify one or more neural targets, such as spinal levels or spinal nerves to be modulated by an existing implanted lead system to achieve a desired therapeutic outcome (e.g., adequate pain relief and avoidance or alleviation of SCS-related side effects or symptoms). The identification of such neural targets may be based on the user input of the autonomic symptoms 1213 and the affected anatomy 1214, optionally along with pain data and patient feedback on pain relief. As described above with reference to FIG. 11, implantable lead placement and electrode locations with respect to neural targets (e.g., spinal levels or spinal nerves), among other factors, would determine the anatomical systems or organs likely to be affected by the stimulation and the degree of symptoms or side effects perceived at those affected organs. Therefore, depending on the lead placement and electrode locations, only certain anatomical systems or organs may be affected by CSC.

The neural target identifier 1221 may use information stored in the database 1230 to more precisely identify the spinal targets to be modulated for pain relief and symptom control. The database 1230 can reside in a memory of the implantable device (e.g., the IPG 627), the RC 628, the CP 629, or a device (e.g., a server of patient medical record) in the external system 523. Information retrieved from the database 1230 for identifying the spinal targets can include a correspondence between the spinal column origins (spinal levels) and anatomical systems or organs innervated by the spinal nerves, information about the implanted leads including lead type (e.g., percutaneous leads, linear paddles, multiple-column paddles, or directional leads, among others) and lead placement and electrode locations, patient health status and medical history (e.g., change in medication, physical activities, medical procedures received), among other information. In an example, the database 1230 may store a lookup table representing the correspondence between the spinal levels or lateral spinal targets and the corresponding anatomical systems or organs innervated by the spinal nerves originated from the respective spinal levels. An example of such a lookup table is discussed below with reference to FIG. 13.

The stimulation controller 1222, coupled to the neural target identifier 1221, can generate an "optimal" or recommended stimulation setting for stimulating a spinal neural target automatically identified by the neural target identifier 1221. The "optimal" or recommended stimulation setting may include electrode configurations (e.g., monopolar, bipoloar, or tripolar stimulation, anode and cathode designation); a location of central point of stimulation that represents a focal point of a stimulation field; one or more stimulation parameters (e.g., a current amplitude or a voltage amplitude, a pulse width, a pulse waveform, a pulse rate, a duty cycle); a modulation waveform continuously adjusting the amplitude, or the pulse width, or the frequency of the trains of pulses, where the modulation waveform can be a random signal, sinewave, triangular, exponential, logarithmic, quadratic, or any other modulating function. In an example, the stimulation setting may include ON-OFF cycling of stimulation bursts that comprises a pulse train in an ON period, followed by a pulse-free period in an OFF cycle.

In an example, the stimulation setting may include paresthesia-based stimulation, which may cause paresthesia sensation during stimulation. Examples of the paresthesia-based stimulation may include a monopolar stimulation mode, a bipolar stimulation mode, a tripolar stimulation mode, a steering mode, a Sensations mode, and a rotation mode. The stimulation may be cathodic or anodic. In an example, monopolar anodic stimulation may be applied after a search using Multiple Independent Current Control (MICC) through the different electrode-tissue contacts to refine the size and shape of a stimulation field, and to customize therapy for individual patients. In an example, monopolar anodic stimulation may be applied with Time-Variant Pulses (TVPs), such as defined as rate, pulse width, or amplitude modulated with a specific function, such as a sinusoidal wave function, a random function following a statistical distribution (e.g., a Poisson distribution, or a uniform distribution), or other arbitrary waveforms. TVPs with monopolar anodic stimulation may be applied after a sweet spot search is done using MICC through the different contacts. A sweet spot is a desirable or optimal location for the neuromodulation field. In an example, a test region may be primed with the sub-perception neuromodulation field, and a sweet-spot can be identified as a neural tissue that is therapeutically effective when targeted with sub-perception neuromodulation. The sweet spot test may involve a manual process to reprogram the neuromodulation field parameter set with different values to change the targeted location of the neuromodulation field. In some embodiments of the test, the targeted location may be automatically changed (e.g. trolled) by automatically changing values of the neuromodulation field parameter set. Some embodiments may semi-automatically change values of the neuromodulation field parameter set to change the targeted location of the neuromodulation field. In an example, monopolar cathodic stimulation may be applied with or without the TVPs. In another example, bipolar stimulation may be applied with or without TVPs. The bipolar configuration comprises an anode located at the rootlets, and a cathode located in the mid-lead. In an example, a tripolar stimulation may be applied in the rostrocaudal direction. In some examples, shunting cathodes may be used in MICC fashion to make anodic stimulation more localized (e.g., along rostro-caudal and medo-lateral direction). Because the rootlets span out at this point, the cathodes can be used to shunt away the anodic current from the rootlets that do not correspond to the rootlets of interest.

In an example, a long rostro-caudal anodic monopole may be used to excite a larger region of the DREZ.

In an example, the stimulation setting may include paresthesia-free stimulation, which generally may not cause paresthesia sensation during stimulation. Examples of the paresthesia-free stimulation may include a Fast-Acting Sub-perception Therapy (FAST) mode, a Dorsal Horn Modulation (DHM) mode, a burst mode, and an Low-Rate Active Recharge (LRAR) mode. The FAST mode allows stimulation pulses to be delivered to provide profound paresthesia-free pain relief in a short time period (e.g., several minutes) by increasing surround inhibition. The DHM a stimulation mode that can target inhibitory interneurons over dorsal column fibers. Under the LRAR mode, sub-perception stimulation pulses are delivered at lower frequencies than the typical DHM frequencies.

In some examples, based on positions of lead placement, the stimulation controller 1222 may generate multiple CPS. Each CPS represents a focal point of a stimulation field established by stimulation energy applied to the electrodes on a portion of an epidural lead. The stimulation fields corresponding to the multiple CPS may activate respective spinal neural targets at different spinal cord levels. To generate multiple CPS, the user may program respective plurality of electrodes on a lead with respective paresthesia-based or paresthesia-free stimulation and respective stimulation parameters. Commonly assigned Block et al. U.S. patent application Ser. No. 17/589,738 entitled "SYSTEMS AND METHODS FOR SELECTABLE LATERAL SPINAL CORD STIMULATION," describes various examples of programming stimulation on a user interface for treat pain and avoid undesirable effects, the disclosure of which is hereby incorporated by reference in its entirety.

The stimulation controller 1222 may generate a control signal for adjusting the stimulation setting, such as by tuning one or more stimulation parameters (e.g., pulse width, amplitude, duty cycle (stimulation ON-OFF cycling scheme), stimulation rate, modulation frequency, modulation depth, etc.), and triggering the electrostimulator 1240 to deliver neuromodulation energy at one or more spinal neural targets, such as identified automatically by the neural target identifier 1221 or manually selected by the user, in accordance with the recommended stimulation setting provided by the stimulation controller 1222. The electrostimulator 1240 can be an implantable module, such as incorporated within the implantable system 521. Alternatively, the electrostimulator 1240 can be an external stimulation device, such as incorporated with the external system 522. In some examples, the user may can accept, reject, or modify the recommended stimulation setting, or to separately provide a stimulation setting different than the recommended stimulation setting, via the user input unit 1211, and the control signal may trigger the electrostimulator 1240 to deliver neuromodulation energy in accordance with the user modified or separately provided stimulation setting. The identified spinal neural target and the stimulation setting may be stored in a storage device, such as the storage device 419 of the programming device 413.

In some examples, a user may provide feedback, such as via the user interface device 1210, on pain control and/or symptom relief responsive to the electrostimulation. Based on the patient feedback, the stimulation controller 1222 may keep the existing stimulation setting if satisfactory pain control and symptom relief has been achieved, or to further adjust and optimize stimulation setting in case of inadequate pain control or worsened symptom or side effects.

FIG. 13 illustrates by way of example and not limitation a lookup table 1300 representing a correspondence between (i) anatomical systems 1310 and one or more organs 1320 in each of the systems and (ii) spinal levels 1330 (i.e., spinal column origins of the nerves innervating the respective organs) within a stimulation field created by electrodes of the existing implanted lead system in the patient. The lookup table 1300 may additionally include identification of electrodes 1340 on the implanted leads at each of the spinal levels 1330. The lookup table can be used to select electrodes on the implanted lead system for user-identified autonomic symptoms and affected organs, as to be discussed below with reference to FIG. 14C.

Figure 14A:
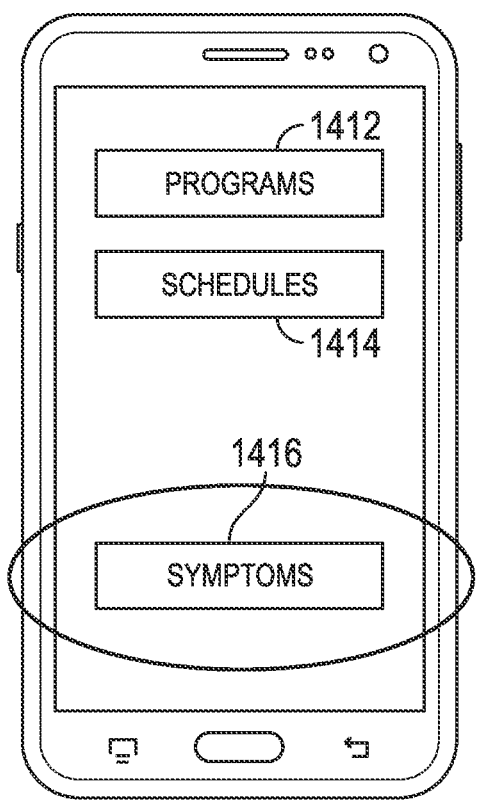
FIGS. 14A-14D are diagrams illustrating an example of a portable device configured to receive user feedback on symptoms and affected anatomy related to neurostimulation therapy such as SCS, and user programming or adjustment of a stimulation setting.

FIGS. 14A-14D are diagrams illustrating an example of a portable device 1400 configured to receive user feedback on symptoms and affected anatomy related to neurostimulation therapy such as SCS, and user programming or adjustment of a stimulation setting. The portable device 1400, which is an example of the user interface device 1210, can be a personal mobile device (e.g., a smartphone) executing a specialized software application for CSC-related symptom management. FIG. 14A illustrates portions of a user interface on a display of the portable device 1400, which shows a main menu comprising user selectable sub-menus or commands (represented by respective icons) including a program menu 1412 for programming a stimulation setting or selecting from a list of predetermined stimulation programs, a schedule menu 1414 for changing stimulation schedules, and a symptom menu 1416 for providing user feedback on SCS-related symptoms or side effects. A user may tap on the symptom menu 1416 icon (or otherwise click on the symptom menu 143 using a UI control element on the user interface) to enter a screen that allows the user to provide feedback on SCS-related symptoms or side effects.

Figure 14B:
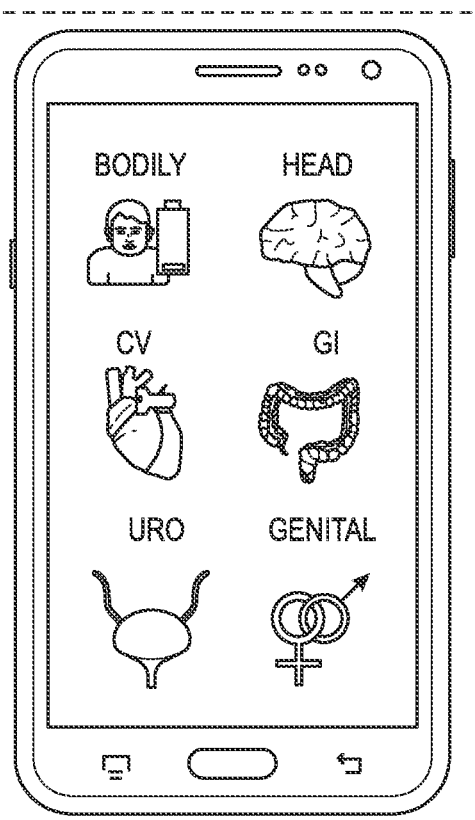
Figure 14B:
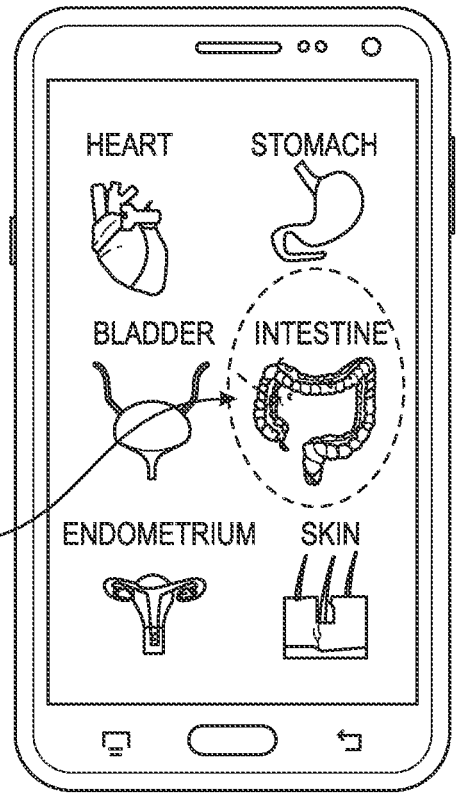

FIG. 14B illustrates portions of a user interface that displays a list of anatomical systems or organs that are supported by the lead system implanted in the patient. Display of the list of anatomical systems or organs may be triggered by user selection of the symptom menu 143. The "supported" anatomical systems and organs, which can be identified by the neural target identifier 1221 as described above, are anatomies innervated by spinal nerves with spinal column origins or spinal neural targets within a stimulation field created by electrodes of the existing implanted lead system. By way of example and not limitation, the anatomical systems may include bodily, head, cardiovascular, gastrointestinal, urological, and genital systems, among others. Depending on the lead placement and electrode locations, the anatomical organs may include heart, stomach, intestines, bladder, endometrium, and skin, among others.

Figure 14C:
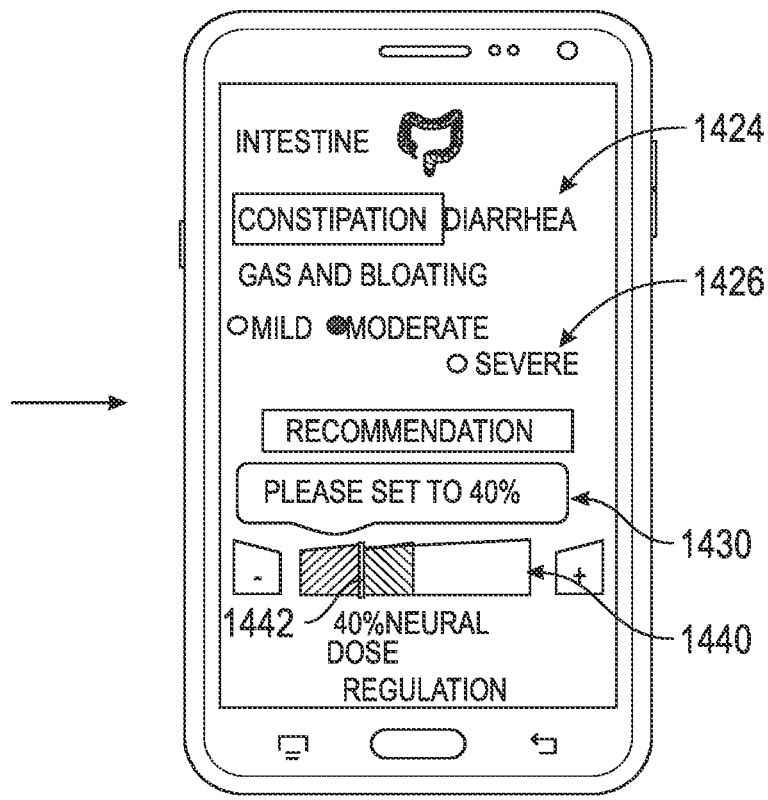

From the list of anatomical systems and organs displayed on the user interface, the patient can select an anatomical system or an organ associated with symptoms or side effects caused by or related to the SCS therapy, such as by tapping on or clicking on the corresponding icon of the system or organ. FIG. 14C illustrates portions of the user interface that displays a list of symptoms 1424 associated with the system or organ identified by the user from the screen in FIG. 14B, such as intestine 1422 in this example. The pre-generated list of symptoms 1424 associated with a particular anatomical system or organ may be determined based on data collected (e.g., patient survey) from a patient population. For example, the intestinal symptoms may include constipation, diarrhea, or gas and bloating. In another example, the symptoms 1424 can include visceral pain of one or more internal organs, such as bladder pain, endometriosis, irritable bowel syndrome, and prostate pain. The patient may select from the displayed symptoms applicable symptoms (e.g., constipation in this example), such as by tapping on or clicking on the corresponding icon of the symptom. The user may provide additional characterization or description of the identified symptom, such as symptom severity 1426. The severity 1426 can have numerical value (e.g., on a 1 to 5 scale) or a categorical value (e.g., "Mild", "Moderate", or "Severe").

An "optimal" or recommended stimulation setting 1430 can be generated by the controller circuit 1220 of the neuromodulation system 1200 based on the user feedback on the symptoms and the affect anatomy. In some examples, other information such as the correspondence between the spinal levels/spinal nerves and anatomical systems or organs being innervated (e.g., the lookup table 1300 in FIG. 13), patient implanted lead placement, or patient health status and medical history, may also be determine the "optimal" or recommended stimulation setting. For example, the lookup table 1300 can be used to select electrodes on the implanted lead system for user-identified autonomic symptoms and affected organs. For example, for symptoms of constipation in intestine, electrodes at spinal levels T6-T12 may be selected. An "optimal" or recommended stimulation setting can be determined as one with reduced stimulation dosing (e.g., smaller pulse amplitude, shorter pulse width, lower stimulation frequency, or an ON-OFF cycling scheme with a shorter ON period) on the selected electrodes at spinal levels T6-T12 to alleviate constipation. The "optimal" or recommended stimulation setting 1430 can be displayed in a recommendation panel on the user interface.

In an example, the stimulation setting can be represented by a single composite neurostimulation dose within a specific value range (e.g., 0-100%), where a higher value indicates a higher stimulation dose. FIG. 14C shows an "optimal" or recommended composite neurostimulation dose of 40%, as determined by the controller circuit 1220. The single composite neurostimulation dose can be obtained by projecting a multi-dimensional parameter space onto a single composite neurostimulation dose dimension. The multi-dimensional parameter space is spanned by multiple stimulation parameters (e.g., amplitude, pulse width, frequency, ON and OFF cycle durations, among others) each taking values within their respective value ranges. The projection of multi-dimensional parameter space onto a 1-D composite neurostimulation dose can be carried out according to a specific projection rule. In an example, the projection rule can be represented by a projection matrix, such that the 1-D composite neurostimulation dose can be computed as a combination of the plurality of the stimulation parameter, followed by quantizing the combined value int values within a specified range (e.g., 0-100%). The composite neurostimulation dose thus computed corresponds to a plurality of stimulation parameters each taking respective values within their respective value ranges. In another example, the projection rule is dimension selection rule in which case the composite neurostimulation dose represents one particular parameter selected from the plurality of the stimulation parameters. Examples of the correspondence between the composite neurostimulation dose and a plurality of stimulation parameters are discussed below with reference to FIGS. 15A-15B.

In the example illustrated in FIG. 14C, the recommended stimulation setting can be represented by the single composite neurostimulation dose of 40%. The recommended composite neurostimulation dose can be displayed graphically on an adjustable 1-D dose bar 1440 representing the value range from 0 to 100%. The user may accept or reject the recommended composite neurostimulation dose, or modify the recommended dose such as by dragging a slider 1442 along the 1-D dose bar 1440 and positioning the slider 1442 at a desired dose value other than the recommended value. As the composite neurostimulation dose is a projection from multiple stimulation parameters, a user modification of the neurostimulation dose (e.g., via the slider 1442 along the 1-D dose bar 1440) would cause simultaneous titration of multiple stimulation parameters.

Figure 14D:
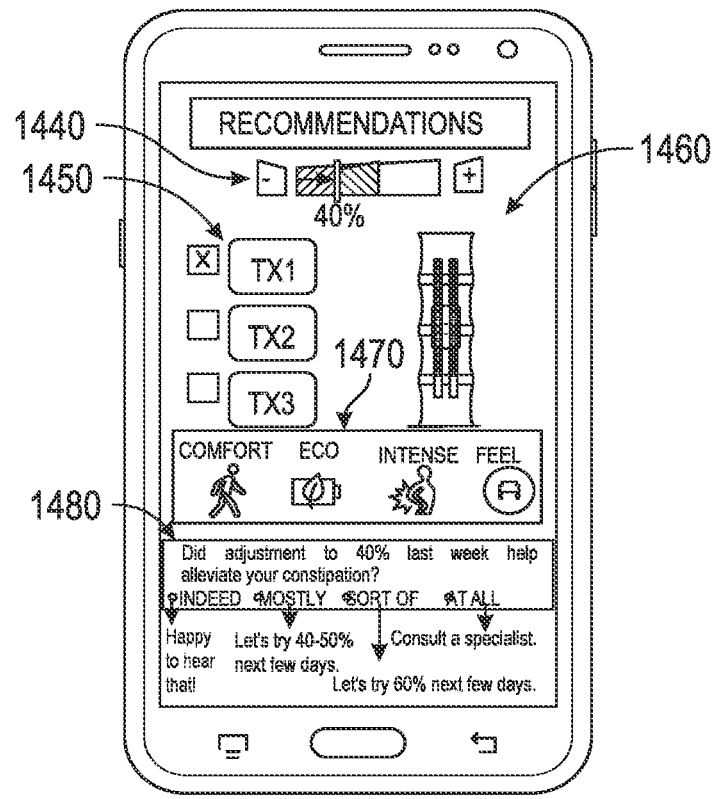

In some examples, the portable device 1400 may allow the user to perform device programming by adjusting each of a plurality of stimulation parameters. FIG. 14D illustrates portions of the user interface that displays, by way of example and not limitation, one or more of a 1-D dose bar 1440 (as similarly shown in FIG. 14C), a selectable stimulation waveform menu 1450, a stimulation site selector 1460, and a stimulation mode menu 1470. The selectable stimulation waveform menu 1450 allows a user to select a therapy from a group of therapies (e.g., Tx1, Tx2, and Tx3). Each therapy comprises one or more therapy parameters, such as a stimulation waveform pattern. In an example, the stimulation waveform pattern can include a biphasic waveform including a first charge phase and a subsequent active recharge (or charge recovery) phase, as used in a Fast-Acting Sub-Perception Therapy (FAST) stimulation mode. The selectable stimulation waveform menu 1450 may further allow a user to select or adjust a duty cycle that defines the amount of time that stimulation pulses (such as stimulation pulses with active recharge waveforms) are delivered (ON period) or withheld (OFF period). The duty cycle can be represented by a ratio of ON period to OFF period (e.g., 1:1 for equal ON period and OFF period, 1:8 for OFF period being eight times the duration of ON period). The duty cycle can alternatively be represented by a percentage of time (e.g., between 0 and 100%) that stimulation is ON. For example, a duty cycle of 100% corresponds to continually running stimulation pulses, 0% corresponding to stimulation completely off, and 50% corresponding to stimulation pulses running for an ON period (from second to minutes) followed by an equal duration of OFF period. In an example, the selectable stimulation waveform menu 1450 may include active recharge waveforms with distinct duty cycles, such as a range from 1:1 to 1:8 (e.g., 1 minute ON/3 minutes OFF; 30 seconds ON/2 minutes OFF; 30 seconds ON/4 minutes OFF), among other selectable duty cycles. The stimulation pulses can be fixed pulses, or modulated pulses (e.g., via one or more of a frequency modulation, a pulse-width modulation, an amplitude modulation) or a stochastic pulses.

The stimulation site selector 1460 allows a user to re-allocate stimulation anatomical locations and/or electrical configurations. For example, the user may be recommended to steer stimulation to another location using a Multiple Independent Current Control (MICC) trolling algorithm to refine the size and shape of the stimulation field and customize therapy for individual patients, or selecting a neurostimulation program to stimulate target locations, such as one of a Fast-Acting Sub-perception Therapy (FAST) mode, a Dorsal Horn Modulation (DHM) mode, a burst mode, or an Low-Rate Active Recharge (LRAR) mode as described above. For example, the user may be recommended to position and configure the electrodes to create a 16 mm DHM electric field at substantially mid T9 vertebrae.

The stimulation mode menu 1470 allows a user to select a stimulation mode from a set of predetermined stimulation modes including, for example, a COMFORT mode, an ECO mode, an INTENSE mode, or a FEEL mode. The COMFORT mode can be used for normal everyday use. The ECO mode can provide stimulation parameters having a low power draw. The INTENSE mode can be usable for example if the patient is experiencing pain, and would benefit from more intense stimulation. The FEEL mode allows a patient to feel the stimulation (supra-perception). The stimulation mode menu 1470 may additionally include modes optimized for patient's activity, such as a SLEEP mode that optimizes the stimulation parameters for the patient while sleeping (e.g., when the patient is lying down and is not moving significantly), an EXERCISE mode that provide stimulation parameters appropriate for when the patient is exercising (e.g., when the patient is standing up and is moving significantly), or other stimulation modes designed for different patient postures, such as supine, prone, standing, sitting, etc., or for different conditions such as cold or bad weather. A patient can select from these stimulation modes, and such selections can program the electrostimulator to provide a subset of stimulation parameters useful for that mode governed by the optimal stimulation parameters.

In a multi-dimensional parameter space spanned by multiple stimulation parameters each taking values within their respective value ranges, the stimulation modes each represent a respective subspace in the multi-dimensional parameter space. Each subspace is defined by the stimulation parameters taking values within respective subsets of the value ranges. For example, the COMFORT mode, ECO mode, INTENSE mode, and FEEL mode each represent respective subspaces in the parameter space, where the ECO mode can have a stimulation frequency range of approximately 2-100 Hz and a PW range of approximately 350-400 microseconds (µs); the COMFORT mode can have a stimulation frequency range of approximately 100-400 Hz and a PW range of approximately 150-250 µs; the INTENSE mode can have a stimulation frequency range of approximately 400-1200 Hz and a PW range of approximately 50-150 µs; the FEEL mode can have a stimulation frequency range of approximately 2-100 Hz and a PW range of approximately 250-350 µs. The FEEL mode corresponds to a supra-perception stimulation, while the COMFORT mode, ECO mode, and INTENSE mode all correspond to sub-perception stimulation.

The user interface as shown in FIG. 14D may additionally receive a feedback 1480 on the system recommended or user provided stimulation setting. The feedback can be provided by a user, including, for example, a level of user satisfaction with the pain relief and symptom control as a result of the neurostimulation in accordance with the recommended or user provided stimulation setting. An acknowledgement of user feedback and further recommendations may be generated and presented to the user, depending on the user satisfaction level. For example, the stimulation controller 1222 may keep the existing stimulation setting if the patient is satisfied with the current setting, or automatically adjust the parameter setting or recommend a different parameter setting if the patient is unsatisfied with the current setting. Alternatively or additionally, the feedback 1480 may be represented by signals gathered from biosensors (e.g., wearable sensors). For example, a heart patch and or wrist watch can provide cardiovascular metrics (related to heart rate, blood pressure, etc.) using different sensing technologies. These feedback signals can be used to automatically adjust the parameter setting or recommend a different parameter setting for neurostimulation.

Figure 15B:

FIGS. 15A-15B illustrate examples of a tabular presentation (e.g., a parameter table 1510 in FIG. 15A, and a parameter table 1520 in FIG. 15B) of a correspondence between a single neurostimulation dose parameter (D) and multiple stimulation parameters $\{P_1, P_2, \ldots, P_N\}$ each taking respective values. The single neurostimulation dose, as discussed above with reference to FIGS. 14C-14D, can be obtained by projecting a multi-dimensional stimulation parameter space, spanned by multiple stimulation parameters (e.g., pulse amplitude, pulse width, frequency, duty cycle represented by an ON-OFF cycling scheme including ON period and OFF period) each taking values within their respective value ranges, onto a one-dimensional dose domain. The single neurostimulation dose represents a combination of a set of stimulation parameters. Each dose value (e.g., 40% as shown in FIG. 14C) represents a unique combination of the set of parameters taking respective values.

The tabular presentation illustrated in FIGS. 15A-15B represents discrete composite neurostimulation dose values (ranging from 0 to 100% with a 1% increment) and a set of parameters taking respective values. For example, in row one of the table, $D_1$ corresponds to $\{P_1=a_1, P_2=a_2, \ldots, P_N=a_N\}$, in row to the table, $D_2$ corresponds to $\{P_1=b_1, P_2=b_2, \ldots, P_N=b_N\}$, etc., where $a_i$'s and $b_k$'s are parameter values. The parameter table 1510 in FIG. 15A illustrates composite neurostimulation dose values and the corresponding stimulation parameters ON period, OFF cycle, and charges per hour (CPH, representing estimated charges in micro Coulombs (μC) per hour as consumed by the electrostimulator). Pulse amplitude (A), pulse width (PW), and frequency (Freq) are set to their respective fixed values (A=2.8 mA, PW=200 micro-seconds, Freq=200 Hz) and are not included in the parameter table 1510. Each composite neurostimulation dose value corresponds to an ON period, an OFF period, and a CPH value according to parameter table 1510. For example, dose value D=0 corresponds to continuous stimulation (i.e., completely ON, no OFF period); D=1 corresponds to minimum cycling (ON period of 2 minutes and OFF period of 30 seconds); D=100 corresponds to maximum cycling (ON period of 30 seconds and OFF period of 5 minutes). Similarly, the parameter table 1520 in FIG. 15B illustrates composite neurostimulation dose values and the corresponding parameters pulse width, pulse amplitude, frequency, duty cycle represented by ON-OFF cycling (including ON period and OFF period), ON time per hour (seconds/hour), and CPH. Each composite neurostimulation dose value corresponds to an ON period, an OFF period, and a CPH value according to parameter table 1520. As shown in FIG. 15A, the recommended composite neurostimulation dose value of 40% corresponds to ON period of 90 seconds, OFF cycle of 30 seconds, and a CPH of 101 μC. By accepting the recommended dose value, or setting the composite neurostimulation dose to a different value such as via the 1-D dose bar 1440 of FIG. 14C, parameter values on the corresponding row of the table can be automatically selected and programmed to the electrostimulator 1240 to deliver electrostimulation accordingly.

In an example, the parameter table 1510 or the parameter table 1520 can be sorted with respect to one or more parameters, such as in a descending order or an ascending order of one or more stimulation parameters at respective columns on the table. The 1-D dose bar (0-100%) can then be arranged according to the sorted table. For example, in the example as shown in FIG. 15A, the parameter table 1510 is sorted in a descending order of a duty cycle (or a ratio of ON period to OFF period) or the ON period (e.g., from 2 minutes down to 30 seconds), and the 1-D dose bar (0-100%) can be arranged according to descending order of the duty cycle or the ON period. The parameter table 1520 can alternatively be sorted with respect to the other parameters such as OFF period, charge per hour (CPH), frequency (e.g., from 1000 Hz down to 50 Hz), pulse width, or amplitude, and the 1-D dose bar (0-100%) can be arranged according to the sorted table.

Figure 16:
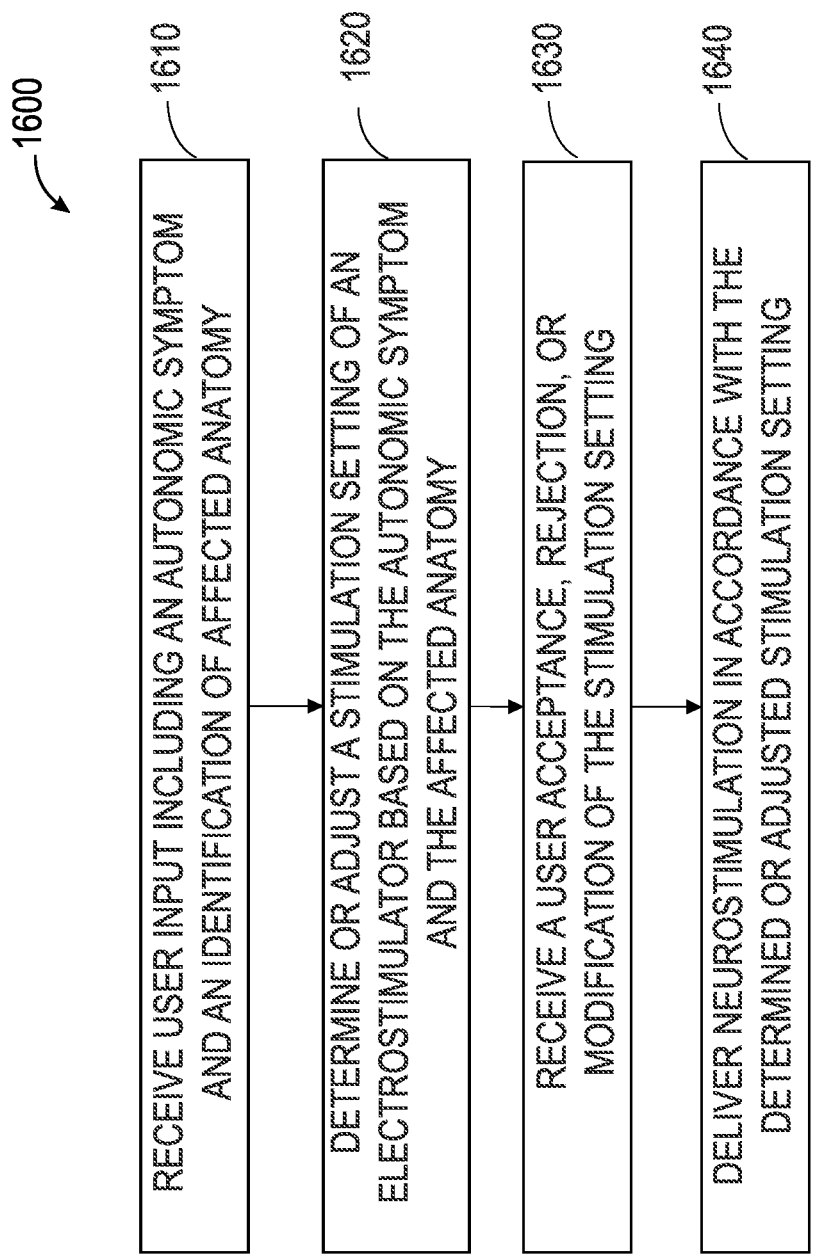
FIG. 16 is a flow chart illustrating, by way of example and not limitation, a method for programming and providing neurostimulation to a neural target to avoid or alleviate autonomic symptoms and side effects.

FIG. 16 is a flow chart illustrating, by way of example and not limitation, a method 1600 of programming and providing neurostimulation to a neural target to avoid or alleviate autonomic symptoms and side effects. The method 1600 may be carried out using a medical system such as one of the neuromodulation systems 210 or 1200. Portions of the method 1600 may be implemented in an external device, such as a device in the external system 522, or one of the programming devices 213 or 413, the CP 629, or the RC 628.

In an example, the method 1600 may be used to program and provide spinal cord stimulation (SCS) at a spinal neural target. The SCS can be a part of pain management regimen. By executing the method 1600, the programming device or the external device may program a neuromodulation device (e.g., one of the neuromodulation devices 212, 312 or 512, or the IPG 627, or the electrostimulator 1240) to deliver stimulation to various spinal neural targets. The method 1600 can be used to optimize SCS setting to avoid or alleviate autonomic symptoms or side effects due to the SCS, while maintaining or improving pain control efficacy. Additionally or alternatively, the method 1600 may be used to titrate SCS to treat or alleviate certain autonomic disorders.

The method 1600 can commence at 1610 to receive information about autonomic symptoms and affected anatomy from a user (e.g., a patient, or a healthcare provider) via a user interface. The autonomic symptoms may result from or relate to SCS delivered to the patient in accordance with a particular stimulation setting. The stimulation setting can be defined by a set of stimulation parameters with respective programmed values. The affected anatomy 1214 may include certain systems (e.g., bodily, head, cardiovascular, gastrointestinal, or urological systems) or organs (e.g., heart, stomach, intestines, bladder, endometrium, skin) where the side effects or symptoms arise or persist. In some examples, the user may additionally provide information about the severity of an autonomic symptom or a side effect. The severity can take a numerical value (e.g., on a 1 to 5 scale) or a categorical value (e.g., "Mild", "Moderate", or "Severe"). The autonomic symptom, the affected anatomy, the severity of the symptom, and patient response to electrostimulation (either feedback provided by the patient or signals sensed by biosensors) may be provided in different formats, such as texts, graphs, or verbal descriptions.

In some examples, pain data, patient feedback on pain relief by the existing SCS therapy, and/or patient health or medical information may also be received at 1610. Such information, along with the autonomic symptom and the affected anatomy, may be used to optimize the SCS therapy.

The user input of the autonomic symptoms and the identified affected anatomy, along with other information received at step 1610, can be presented on a display of the user interface. In an example, a pre-generated list of symptoms and the anatomical systems or organs likely to be affected by SCS can be displayed on the user interface. A user can use one or more UI control elements to select applicable symptoms, the affected systems or organs, and optionally the severity of the symptom, as illustrated in FIGS. 14A-14D.

At 1620, a stimulation setting can be determined or adjusted for an electrostimulator based on the autonomic symptoms and the affected anatomy received from 1610. The stimulation setting can be defined by a set of stimulation parameters with respectively "optimized" or recommended values that, when used in neurostimulation therapy such as SCS for pain control, can help avoid or alleviate SCS-related side effects or symptoms while maintaining or improving pain relief. To determine an "optimal" or recommended stimulation setting, one or more neural targets can be identified as those within a stimulation field created by electrodes of the existing implanted lead system in the patient. The identification of such neural targets may be based on the autonomic symptoms and the affected anatomy, optionally along with pain data and patient feedback on pain relief. In an example, a correspondence between the spinal column origins (spinal levels) and anatomical systems or organs being innervated by the spinal nerves, information about existing leads implanted in the patient including lead type, lead placement, and electrode locations, can also be used to facilitate identification of spinal targets covered by the implanted lead system. In an example, the lookup table 1300 in FIG. 13 can be used to select electrodes on the implanted lead system for user-identified autonomic symptoms and affected organs. An "optimal" or recommended stimulation setting can be determined as one with reduced stimulation dosing (e.g., smaller pulse amplitude, shorter pulse width, lower stimulation frequency, or an ON-OFF cycling scheme with a shorter ON period) on the selected electrodes at spinal levels T6-T12 to alleviate constipation. In an example, the "optimal" or recommended stimulation setting can be represented by a single composite neurostimulation dose obtained by projecting a multi-dimensional parameter space onto a single composite neurostimulation dose dimension. The recommended stimulation setting can be graphically represented on a 1-D dose bar, as illustrated in FIG. 14C.

At 1630, user acceptance, rejection, or modification of the recommended stimulation setting can be received from the user interface. Alternatively, the user can separately provide a stimulation setting different than the recommended stimulation setting. For example, in an example where the recommended stimulation setting is represented by a single composite neurostimulation dose (e.g., 40%) on a 1-D dose bar (as shown in FIG. 14C), the user may accept or reject the recommended dose, or modify the recommended dose to a different dose value. By adjusting the composite neurostimulation dose value, multiple stimulation parameters can be adjusted simultaneously according to the projection rule as discussed above. In various examples, the user may accept, reject, or modify one or more stimulation parameters such as a stimulation waveform, a stimulation site, or a stimulation mode, as discussed above with reference to FIG. 14D. In some examples, one or more biosensors (e.g., wearable sensors) can sense respective signals in response to stimulation delivered in accordance with the recommended stimulation setting. The sensor signals, indicative of patient response to stimulation, can be used to automatically adjust the recommended stimulation setting, or alternatively be presented to the user to assist in optimizing the stimulation setting.

At 1640, neurostimulation energy may be delivered to the patient via an electrostimulator in accordance with the stimulation setting automatically generated and recommended to the user, or otherwise modified or manually provided by the user. In some examples, the user interface may prompt the user to provide feedback on the current stimulation setting, such as an indication of a level of satisfaction with respect to pain relief and symptom control. Acknowledgement of user feedback and further recommendations may be generated and display to the user, depending on the user satisfaction level. Existing stimulation setting can remain unchanged for future use if the patient is satisfied with the therapy and symptom relief, and a different setting can be generated and recommend to the user if the patient is not satisfied with the current setting.

Figure 17:
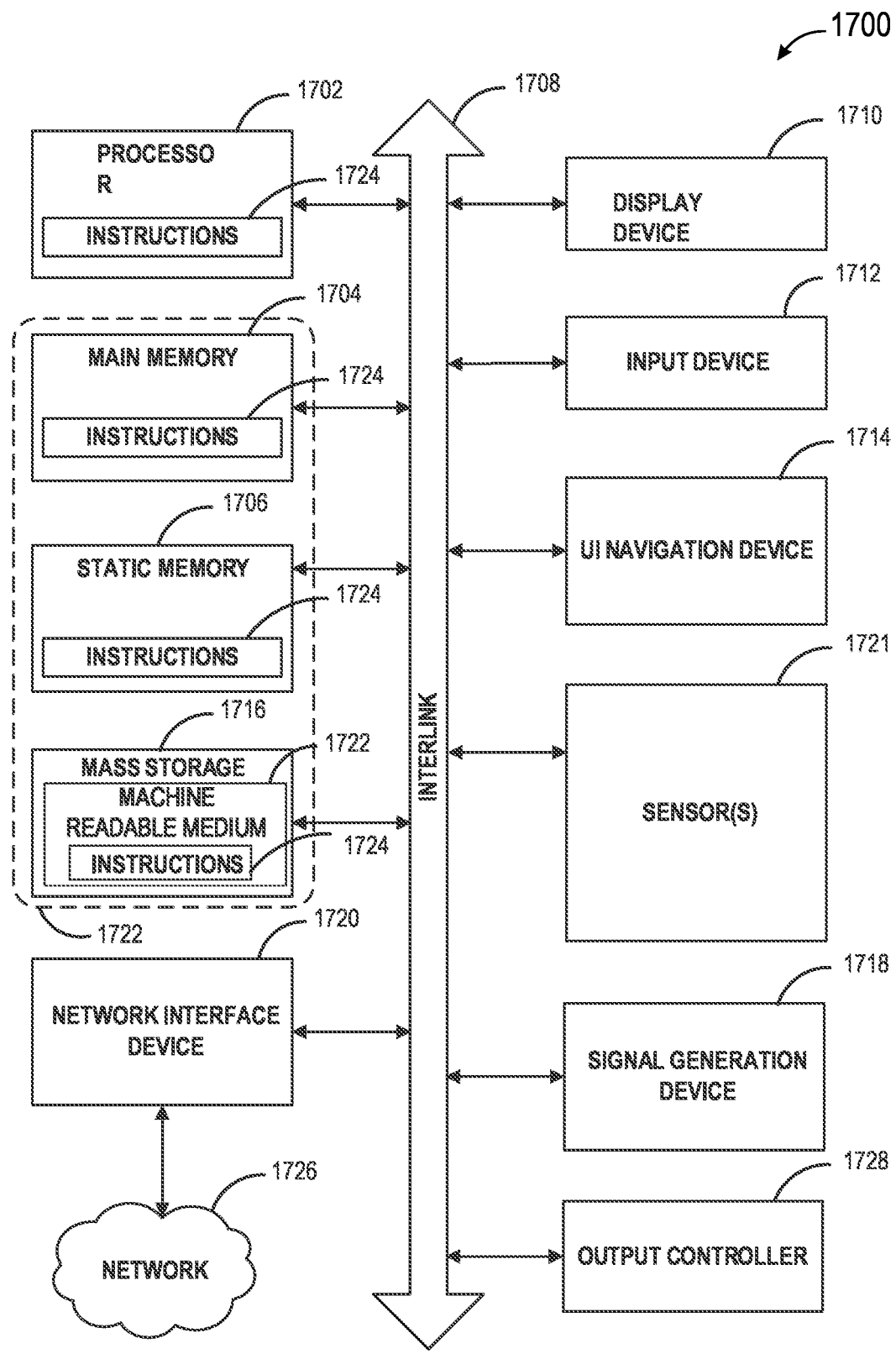
FIG. 17 illustrates generally a block diagram of an example machine 1700 upon which any one or more of the techniques (e.g., methodologies) discussed herein may perform.

FIG. 17 illustrates generally a block diagram of an example machine 1700 upon which any one or more of the techniques (e.g., methodologies) discussed herein may perform. Portions of this description may apply to the computing framework of various portions of the neuromodulation device or the external programming device.

In alternative embodiments, the machine 1700 may operate as a standalone device or may be connected (e.g., networked) to other machines. In a networked deployment, the machine 1700 may operate in the capacity of a server machine, a client machine, or both in server-client network environments. In an example, the machine 1700 may act as a peer machine in peer-to-peer (P2P) (or other distributed) network environment. The machine 1700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 1700 may include a hardware processor 1702 (e.g., a central processing unit (CPU), a graphics processing unit (GPU), a hardware processor core, or any combination thereof), a main memory 1704 and a static memory 1706, some or all of which may communicate with each other via an interlink (e.g., bus) 1708. The machine 1700 may further include a display unit 1710 (e.g., a raster display, vector display, holographic display, etc.), an alphanumeric input device 1712 (e.g., a keyboard), and a user interface (UI) navigation device 1714 (e.g., a mouse). In an example, the display unit 1710, input device 1712 and UI navigation device 1714 may be a touch screen display. The machine 1700 may additionally include a storage device (e.g., drive unit) 1716, a signal generation device 1718 (e.g., a speaker), a network interface device 1720, and one or more sensors 1721, such as a global positioning system (GPS) sensor, compass, accelerometer, or other sensors. The machine 1700 may include an output controller 1728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1716 may include a machine readable medium 1722 on which is stored one or more sets of data structures or instructions 1724 (e.g., software) embodying or utilized by any one or more of the techniques or functions described herein. The instructions 1724 may also reside, completely or at least partially, within the main memory 1704, within static memory 1706, or within the hardware processor 1702 during execution thereof by the machine 1700. In an example, one or any combination of the hardware processor 1702, the main memory 1704, the static memory 1706, or the storage device 1716 may constitute machine readable media.

While the machine-readable medium 1722 is illustrated as a single medium, the term "machine readable medium" may include a single medium or multiple media (e.g., a centralized or distributed database, and/or associated caches and servers) configured to store the one or more instructions 1724.

The term "machine readable medium" may include any medium that is capable of storing, encoding, or carrying instructions for execution by the machine 1700 and that cause the machine 1700 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EPSOM)) and flash memory devices; magnetic disks, such as internal hard disks and removable disks; magneto-optical disks; and CD-ROM and DVD-ROM disks.

The instructions 1724 may further be transmitted or received over a communication network 1726 using a transmission medium via the network interface device 1720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as WiFi®, IEEE 802.16 family of standards known as WiMax®), IEEE 802.15.4 family of standards, peer-to-peer (P2P) networks, among others. In an example, the network interface device 1720 may include one or more physical jacks (e.g., Ethernet, coaxial, or phone jacks) or one or more antennas to connect to the communication network 1726. In an example, the network interface device 1720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1700, and includes digital or analog communications signals or other intangible medium to facilitate communication of such software.

Various embodiments are illustrated in the figures above. One or more features from one or more of these embodiments may be combined to form other embodiments.

The method examples described herein may be machine or computer-implemented at least in part. Some examples may include a computer-readable medium or machine-readable medium encoded with instructions operable to configure an electronic device or system to perform methods as described in the above examples. An implementation of such methods may include code, such as microcode, assembly language code, a higher-level language code, or the like. Such code may include computer readable instructions for performing various methods. The code may form portions of computer program products. Further, the code may be tangibly stored on one or more volatile or non-volatile computer-readable media during execution or at other times.

The above detailed description is intended to be illustrative, and not restrictive. The scope of the disclosure should, therefore, be determined with references to the appended claims, along with the full scope of equivalents to which such claims are entitled.

What is claimed is:

1. A system for providing electrostimulation to a patient, comprising:
  an electrostimulator configured to provide neurostimulation to a neural target of the patient via an array of electrodes;
  a user interface device configured to receive a user input including an autonomic symptom and an identification of affected anatomy; and
  a controller circuit communicatively coupled to the user interface device, the controller circuit configured to:
    determine or receive information about a plurality of anatomical systems or different organs innervated by spinal nerves or spinal targets to be stimulated by the electrostimulator via one or more of the array of electrodes;
    determine or adjust a stimulation setting based on the user input of the autonomic symptom and the identification of affected anatomy selected from the plurality of anatomical systems or different organs; and
    generate a control signal to the electrostimulator to deliver neurostimulation energy in accordance with the determined or adjusted stimulation setting to alleviate the autonomic symptom or to treat autonomic disorders.

2. The system of claim 1, wherein the neurostimulation includes spinal cord stimulation (SCS) to a spinal neural target to control pain in the patient, and wherein the user input of the autonomic symptom and the identification of affected anatomy is in response to the SCS.

3. The system of claim 1, wherein the stimulation setting includes one or more stimulation parameters including:
an electrode configuration;
one or more stimulation pulse parameters including a pulse amplitude, a pulse width, or a stimulation frequency;
a stimulation pulse waveform;
an ON-OFF cycling scheme comprising an ON period for delivering stimulation pulses and a subsequent stimulation-free OFF period; or
a charge per second (CPS) or a charge per hour (CPH) delivered to the neural target.

4. The system of claim 3, wherein the stimulation setting includes an ON-OFF cycling scheme represented by a ratio of the ON period to the subsequent OFF period in a range from 1:1 to 1:8, the stimulation pulses during the ON period each having a waveform comprising an active recharge phase.

5. The system of claim 1, wherein the stimulation setting is represented by a single composite neurostimulation dose taking a value within a specific value range, the composite neurostimulation dose corresponding to a plurality of stimulation parameters each taking respective values.

6. The system of claim 1, wherein the user interface device is configured to display the user input of the autonomic symptoms and the identification of affected anatomy.

7. The system of claim 1, wherein the user input further includes a user indication of a severity of the autonomic symptom.

8. The system of claim 1, wherein the neurostimulation includes spinal cord stimulation (SCS) of a spinal neural target via the array of electrodes,
wherein, to determine or adjust the stimulation setting, the controller circuit is configured to select one or more active electrodes from the array of electrodes for delivering the SCS based at least on (i) locations of the array of electrodes with respect to the spinal neural target, and (ii) anatomical systems or organs innervated by spinal nerves and their spinal column origins.

9. The system of claim 8, comprising a memory circuit configured to store a lookup table representing a correspondence between the anatomical systems or organs and the spinal column origins within a stimulation field created by the array of electrodes.

10. The system of claim 1, wherein the user interface device is further configured to:
display a therapy recommendation including the determined or adjusted stimulation setting; and
receive a user acceptance, rejection, or modification of the stimulation setting determined or adjusted by the controller circuit.

11. The system of claim 1, wherein the user interface device is further configured to:
prompt a user to provide a feedback on an alleviation of the autonomic symptom or a treatment of the autonomic disorders by the neurostimulation in accordance with the determined or adjusted stimulation setting; and
display a therapy recommendation including further adjustment of one or more stimulation parameters.

12. The system of claim 1, wherein the user interface device is further configured to receive a user selection or adjustment of a single composite neurostimulation dose within a specific value range, the composite neurostimulation dose corresponding to a plurality of stimulation parameters each taking values within their respective value ranges.

13. The system of claim 12, wherein the user selection or adjustment of the single composite neurostimulation dose is provided via a user interface control element including a slider along a one-dimensional dose bar.

14. The system of claim 1, wherein the user interface device is further configured to receive a user selection of one or more stimulation modes each defined by a plurality of stimulation parameters with their respective values or value ranges.

15. A method for providing electrostimulation to a patient, the method comprising:
receiving, via a user interface device, a user input including an autonomic symptom and an identification of affected anatomy;
determining or receiving information about a plurality of anatomical systems or different organs innervated by spinal nerves or spinal targets to be stimulated by the electrostimulator via one or more of an array of electrodes;
determining or adjusting a stimulation setting for an electrostimulator based on the received autonomic symptom and the identification of affected anatomy selected from the plurality of anatomical systems or different organs; and
delivering neurostimulation energy to the patient using the electrostimulator and the array of electrodes in accordance with the determined or adjusted stimulation setting to alleviate the autonomic symptom or to treat autonomic disorders.

16. The method of claim 15, wherein the neurostimulation includes spinal cord stimulation (SCS) of a spinal neural target to control pain in the patient, and the user input of the autonomic symptom and the identification of affected anatomy is received in response to the SCS.

17. The method of claim 15, wherein the stimulation setting is represented by a single composite neurostimulation dose taking a value within a specific value range, the composite neurostimulation dose corresponding to a plurality of stimulation parameters each taking respective values.

18. The method of claim 15, further comprising:
displaying on a display of the user interface device the user input of the autonomic symptoms and the identification of affected anatomy, a severity of the autonomic symptom, and the determined or adjusted stimulation setting; and
receiving via the user interface device a user acceptance, rejection, or modification of the determine stimulation setting.

19. The method of claim 15, wherein the neurostimulation includes spinal cord stimulation (SCS) of a spinal neural target via the array of electrodes,
wherein determining or adjusting the stimulation setting includes selecting one or more active electrodes from the array of electrodes for delivering the SCS based at least on (i) locations of the array of electrodes with respect to the spinal neural target, and (ii) anatomical systems or organs innervated by spinal nerves and their spinal column origins.

20. The method of claim 15, further comprising receiving, via the user interface device, a user selection or adjustment of a single composite neurostimulation dose within a specific value range, the composite neurostimulation dose corresponding to a plurality of stimulation parameters each taking values within their respective value ranges.

\* \* \* \* \*